Figure 1:
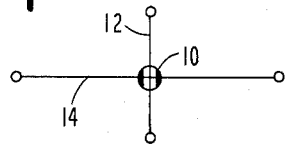

Jan. 18, 1966   E. G. WAGNER   3,230,354
MULTI-LEVEL ADDER ARRANGEMENT
Filed July 29, 1960   24 Sheets-Sheet 1

INVENTOR
ERIC G. WAGNER

BY Thomas & Crickenberger
ATTORNEYS

Jan. 18, 1966  E. G. WAGNER  3,230,354
MULTI-LEVEL ADDER ARRANGEMENT
Filed July 29, 1960  24 Sheets-Sheet 2

Jan. 18, 1966     E. G. WAGNER     3,230,354
MULTI-LEVEL ADDER ARRANGEMENT
Filed July 29, 1960     24 Sheets-Sheet 3

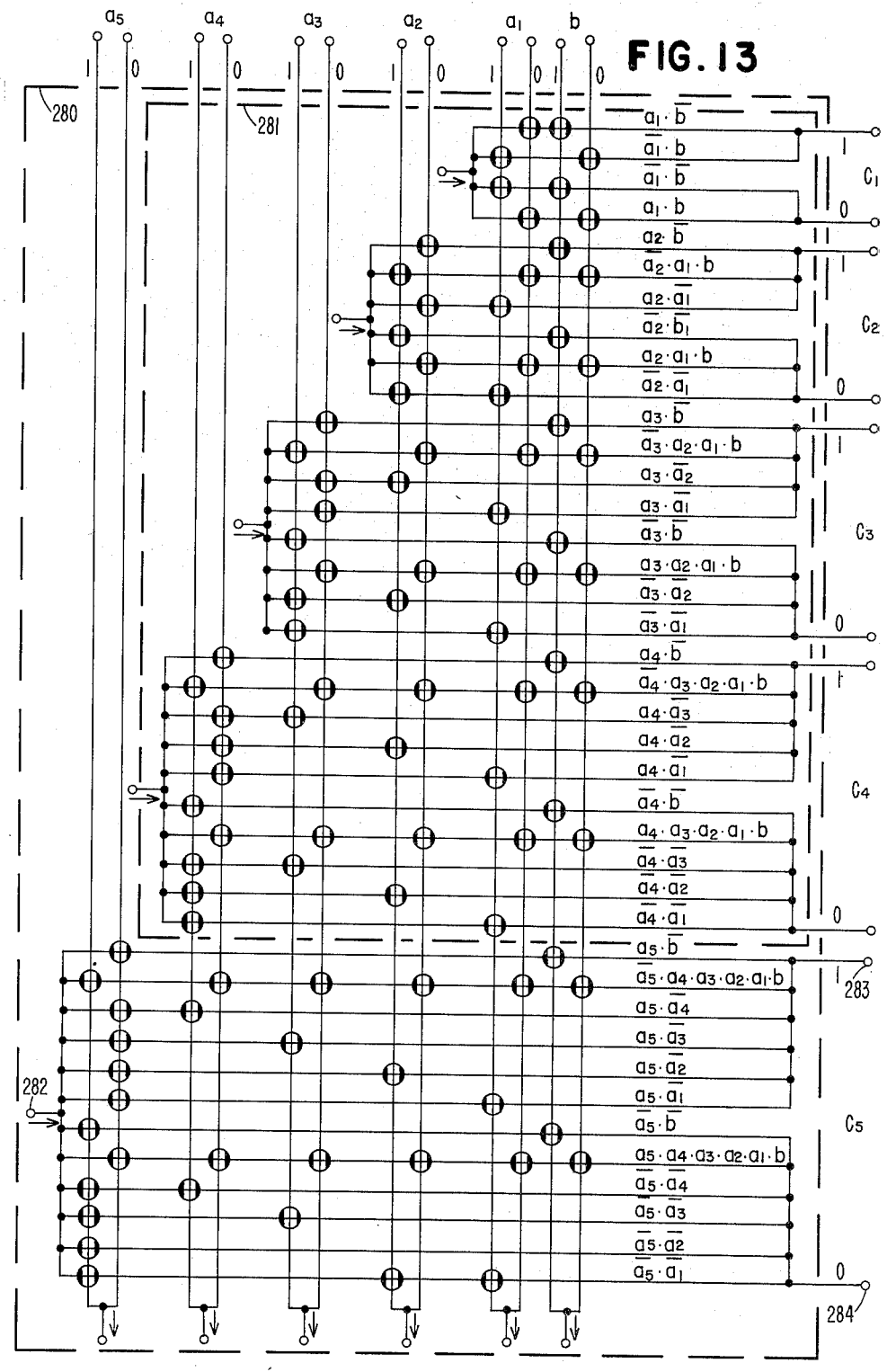

Jan. 18, 1966      E. G. WAGNER      3,230,354
MULTI-LEVEL ADDER ARRANGEMENT
Filed July 29, 1960                   24 Sheets-Sheet 5
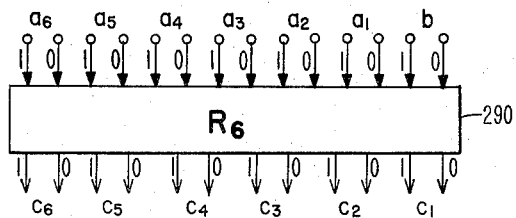
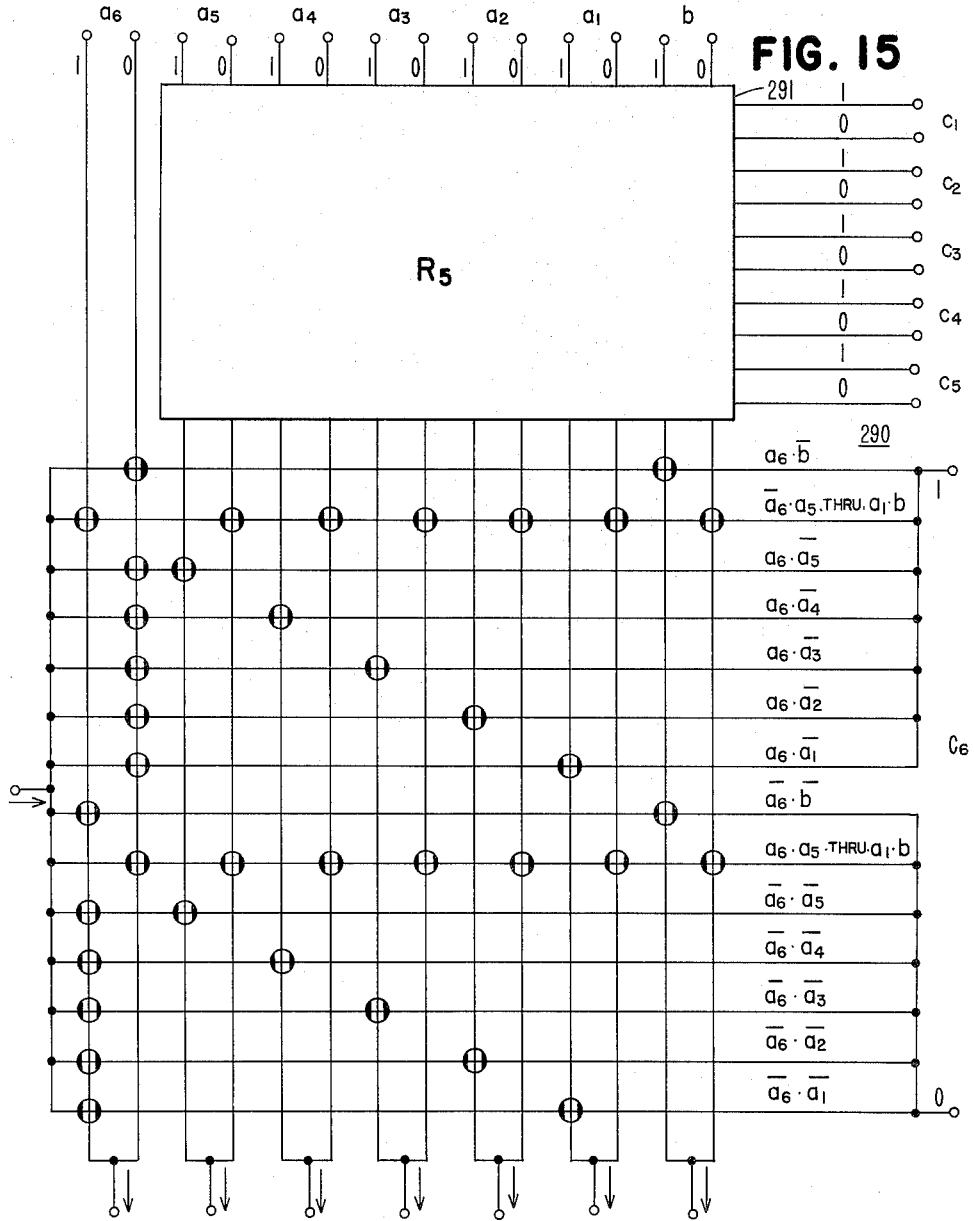

Jan. 18, 1966  E. G. WAGNER  3,230,354
MULTI-LEVEL ADDER ARRANGEMENT
Filed July 29, 1960  24 Sheets-Sheet 6

Jan. 18, 1966 E. G. WAGNER 3,230,354
MULTI-LEVEL ADDER ARRANGEMENT
Filed July 29, 1960 24 Sheets-Sheet 8

Jan. 18, 1966     E. G. WAGNER     3,230,354
MULTI-LEVEL ADDER ARRANGEMENT
Filed July 29, 1960     24 Sheets-Sheet 10

FIG. 23

| | A | B | $Q_1$ | $Q_2$ | $Q_3$ | $Q_4$ | $Q_5$ | ... | $Q_n$ | P |
|---|---|---|---|---|---|---|---|---|---|---|
| | $a_1$ | $b_1$ | $a_1 \cdot b_1$ | 0 | 0 | 0 | 0 | ... | 0 | $P_1$ |
| | $a_2$ | $b_2$ | $a_2 \cdot b_1$ | $a_1 \cdot b_2$ | 0 | 0 | 0 | ... | 0 | $P_2$ |
| | $a_3$ | $b_3$ | $a_3 \cdot b_1$ | $a_2 \cdot b_2$ | $a_1 \cdot b_3$ | 0 | 0 | ... | 0 | $P_3$ |
| | $a_4$ | $b_4$ | $a_4 \cdot b_1$ | $a_3 \cdot b_2$ | $a_2 \cdot b_3$ | $a_1 \cdot b_4$ | 0 | ... | 0 | $P_4$ |
| | $a_5$ | $b_5$ | $a_5 \cdot b_1$ | $a_4 \cdot b_2$ | $a_3 \cdot b_3$ | $a_2 \cdot b_4$ | $a_1 \cdot b_5$ | ... | 0 | $P_5$ |
| | . | . | . | $a_5 \cdot b_2$ | $a_4 \cdot b_3$ | $a_3 \cdot b_4$ | $a_2 \cdot b_5$ | ... | . | . |
| | $a_n$ | $b_n$ | $a_n \cdot b_1$ | . | . | . | . | ... | 0 | . |
| | | | $a_n \cdot b_2$ | . | . | . | . | 0 | . | |
| | | | $a_n \cdot b_3$ | . | . | . | $a_2 \cdot b_n$ $a_1 \cdot b_n$ | . | . | |
| | | | . | . | . | . | . | . | . | |
| | | | $a_n \cdot b_n$ | | | | | | | $P_{2n-1}$ |
| | | | | | | | | | | $P_{2n}$ |

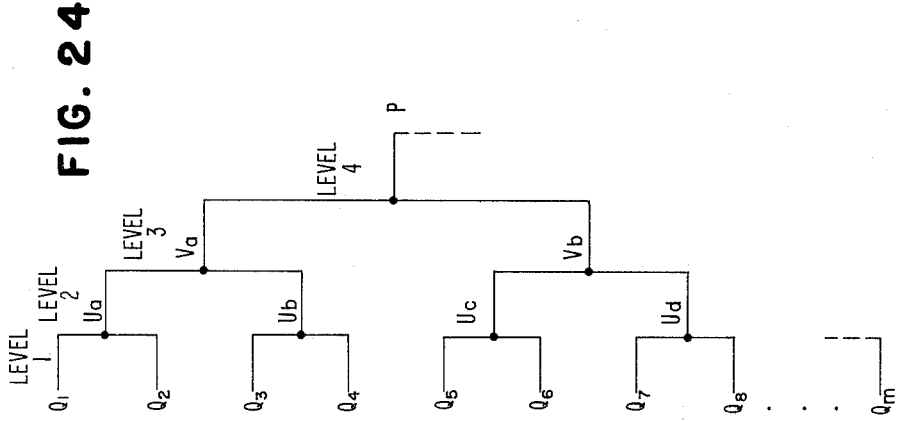

FIG. 24

Jan. 18, 1966   E. G. WAGNER   3,230,354
MULTI-LEVEL ADDER ARRANGEMENT
Filed July 29, 1960   24 Sheets-Sheet 11
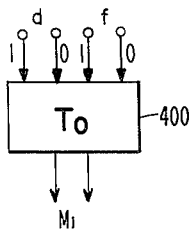
FIG. 25
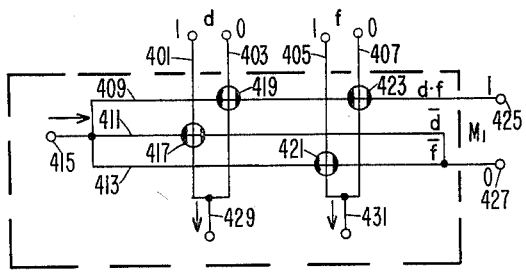
FIG. 26
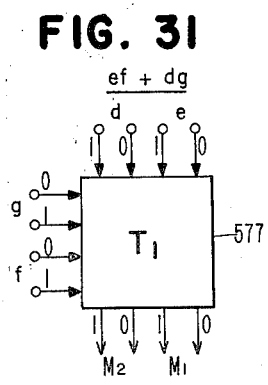
FIG. 31
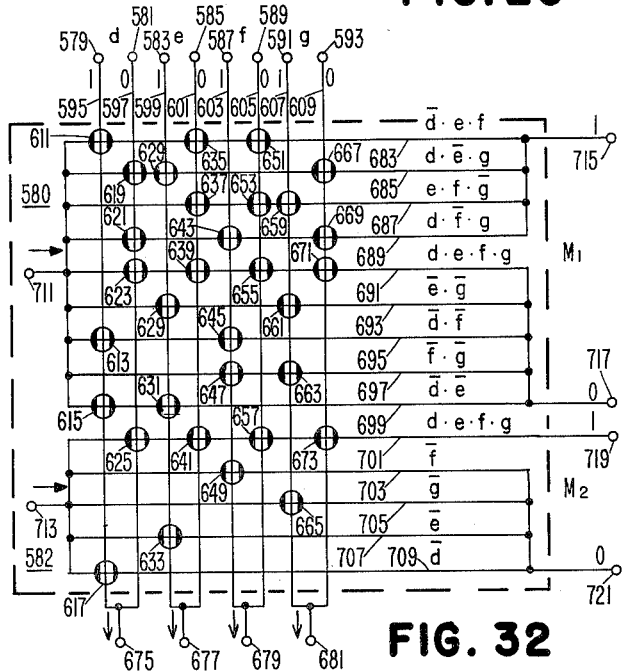
FIG. 32
FIG. 33
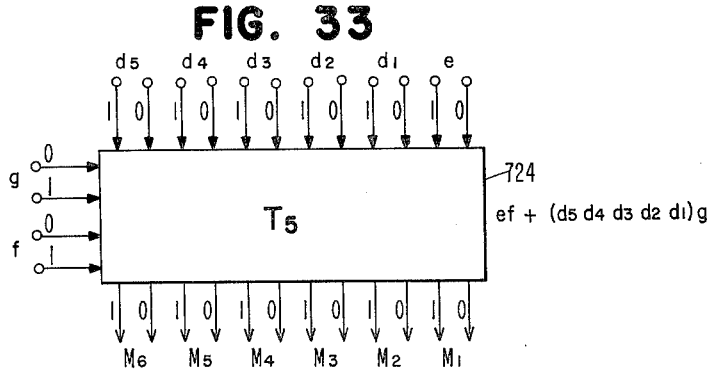

Jan. 18, 1966   E. G. WAGNER   3,230,354
MULTI-LEVEL ADDER ARRANGEMENT
Filed July 29, 1960   24 Sheets-Sheet 13

FIG. 27a

| | | | | | | | | |
|---|---|---|---|---|---|---|---|---|
| | | | | $a_4$ | $a_3$ | $a_2$ | $a_1$ | A |
| | | | | $b_4$ | $b_3$ | $b_2$ | $b_1$ | B |
| | | | | $a_4 b_1$ | $a_3 b_1$ | $a_2 b_1$ | $a_1 b_1$ | $Q_1$ |
| | | | $a_4 b_2$ | $a_3 b_2$ | $a_2 b_2$ | $a_1 b_2$ | 0 | $Q_2$ |
| | | $a_4 b_3$ | $a_3 b_3$ | $a_2 b_3$ | $a_1 b_3$ | 0 | 0 | $Q_3$ |
| | $a_4 b_4$ | $a_3 b_4$ | $a_2 b_4$ | $a_1 b_4$ | 0 | 0 | 0 | $Q_4$ |
| $p_8$ | $p_7$ | $p_6$ | $p_5$ | $p_4$ | $p_3$ | $p_2$ | $p_1$ | P |

FIG. 27b $Q_1 + Q_2 = U_a$

| | | | | | | | |
|---|---|---|---|---|---|---|---|
| | | $a_4 b_1$ | $a_3 b_1$ | $a_2 b_1$ | $a_1 b_1$ | | $Q_1$ |
| | $a_4 b_2$ | $a_3 b_2$ | $a_2 b_2$ | $a_1 b_2$ | 0 | | $Q_2$ |
| | | $S_4$ | $S_3$ | $S_2$ | $S_1$ | | |
| $u_{a6}$ | $u_{a5}$ | | $u_{a4}$ | $u_{a3}$ | $u_{a2}$ | $u_{a1}$ | $U_a$ |

FIG. 27c $Q_3 + Q_4 = U_b$

| | | | | | | | | |
|---|---|---|---|---|---|---|---|---|
| | | $a_4 b_3$ | $a_3 b_3$ | $a_2 b_3$ | $a_1 b_3$ | 0 | 0 | $Q_3$ |
| | $a_4 b_4$ | $a_3 b_4$ | $a_2 b_4$ | $a_1 b_4$ | 0 | 0 | 0 | $Q_4$ |
| | | $S_4$ | $S_3$ | $S_2$ | $S_1$ | | | |
| $u_{b6}$ | $u_{b5}$ | | $u_{b4}$ | $u_{b3}$ | $u_{b2}$ | $u_{b1}$ | | $U_b$ |

FIG. 27d $U_a + U_b = P$

| | | | | | | | | |
|---|---|---|---|---|---|---|---|---|
| | | $u_{a6}$ | $u_{a5}$ | $u_{a4}$ | $u_{a3}$ | $u_{a2}$ | $u_{a1}$ | $U_a$ |
| $u_{b6}$ | $u_{b5}$ | $u_{b4}$ | $u_{b3}$ | $u_{b2}$ | $u_{b1}$ | | | $U_b$ |
| | $S_5$ | $S_4$ | $S_3$ | $S_2$ | $S_1$ | | | |
| $p_8$ | $p_7$ | $p_6$ | $p_5$ | $p_4$ | $p_3$ | $p_2$ | $p_1$ | P |

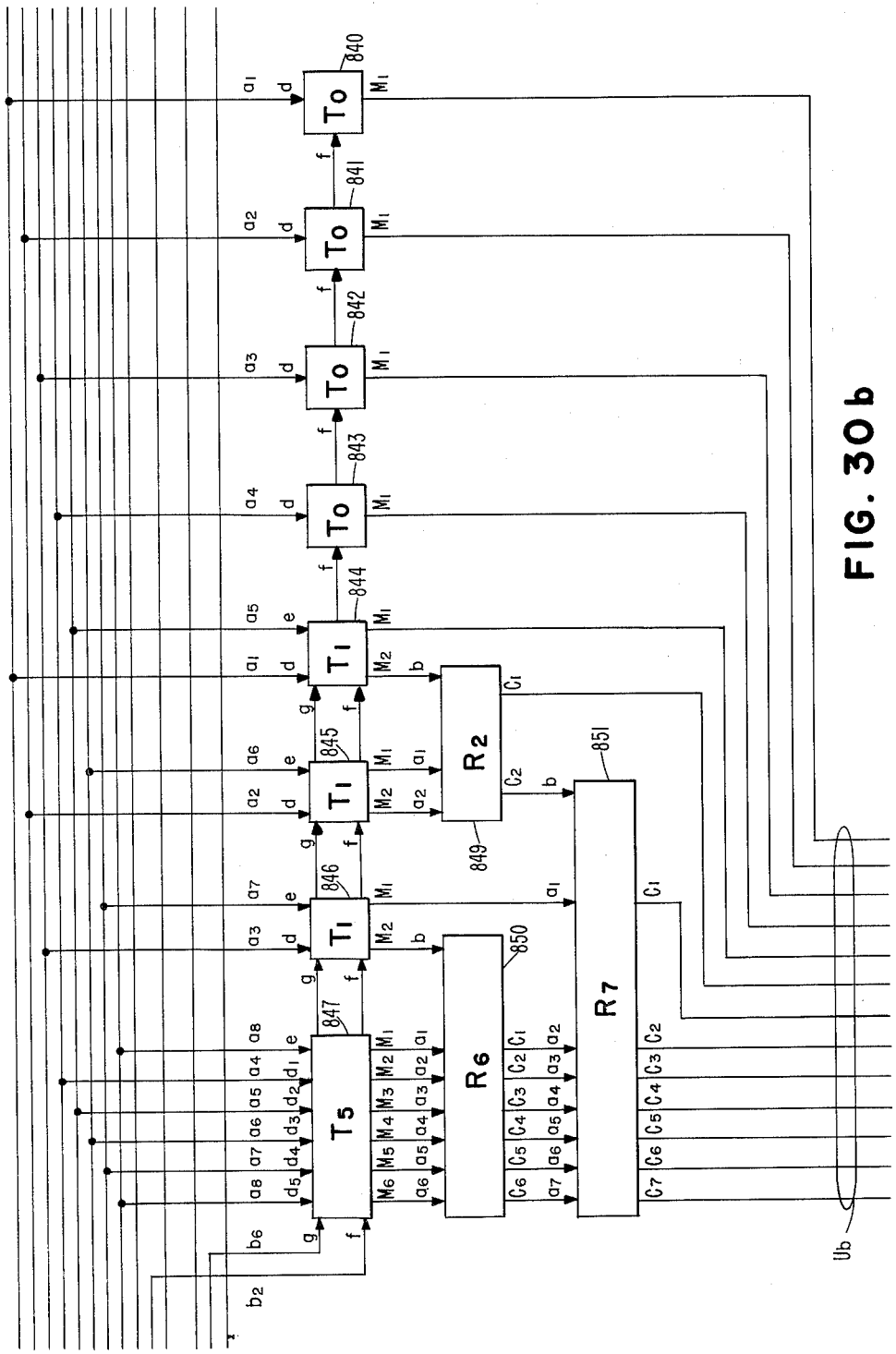

Jan. 18, 1966    E. G. WAGNER    3,230,354
MULTI-LEVEL ADDER ARRANGEMENT
Filed July 29, 1960    24 Sheets-Sheet 17

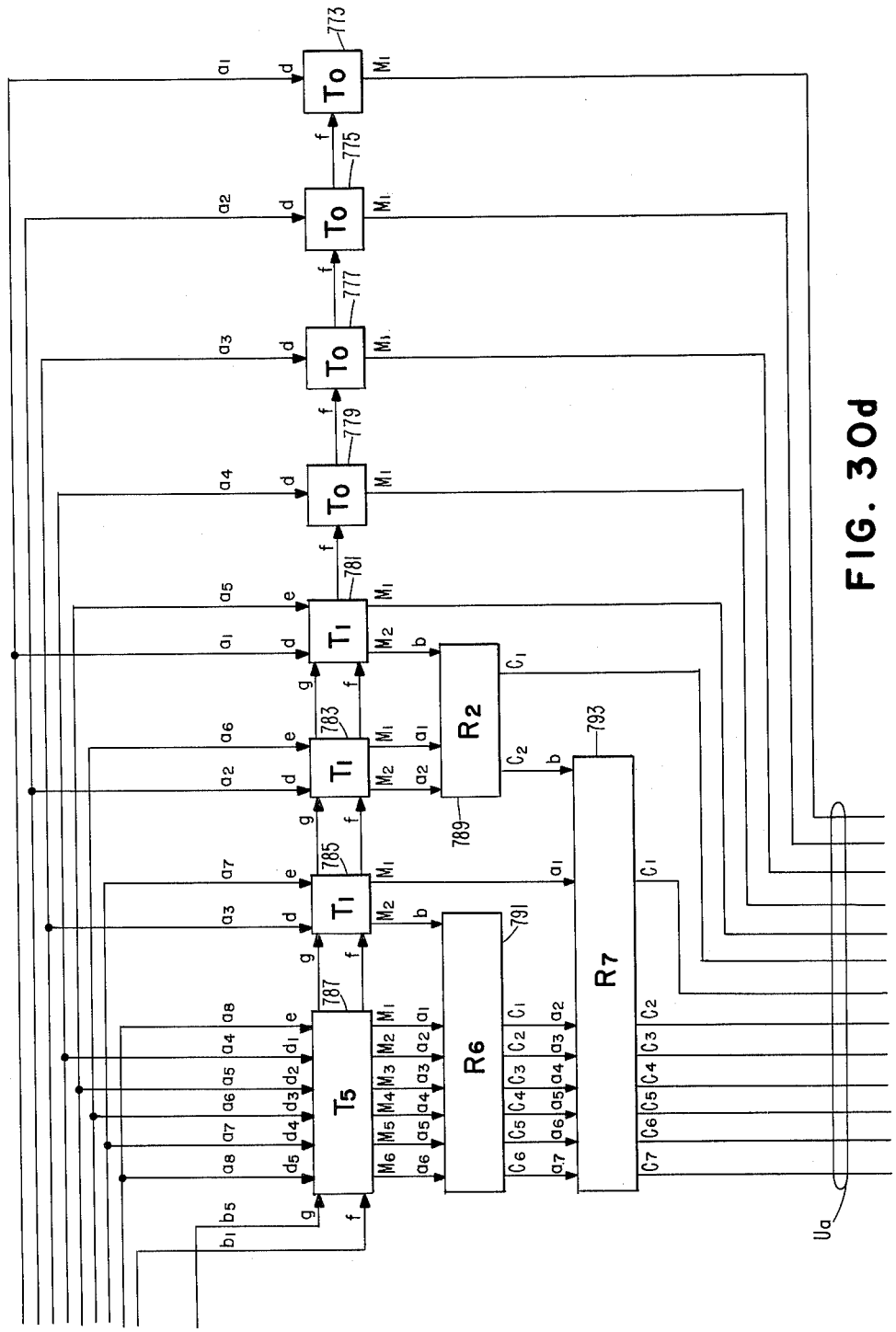

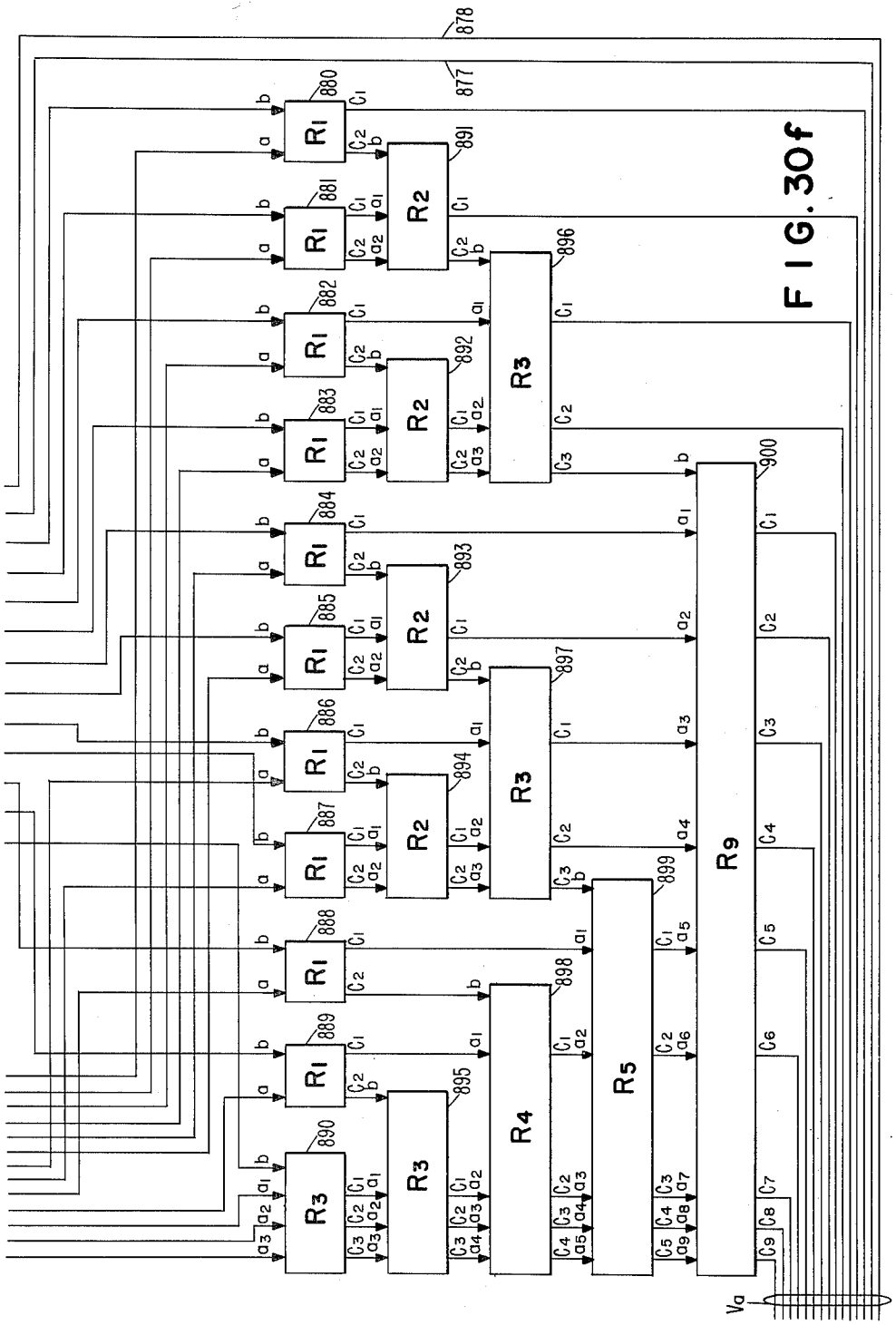

Jan. 18, 1966  E. G. WAGNER  3,230,354
MULTI-LEVEL ADDER ARRANGEMENT
Filed July 29, 1960  24 Sheets-Sheet 22

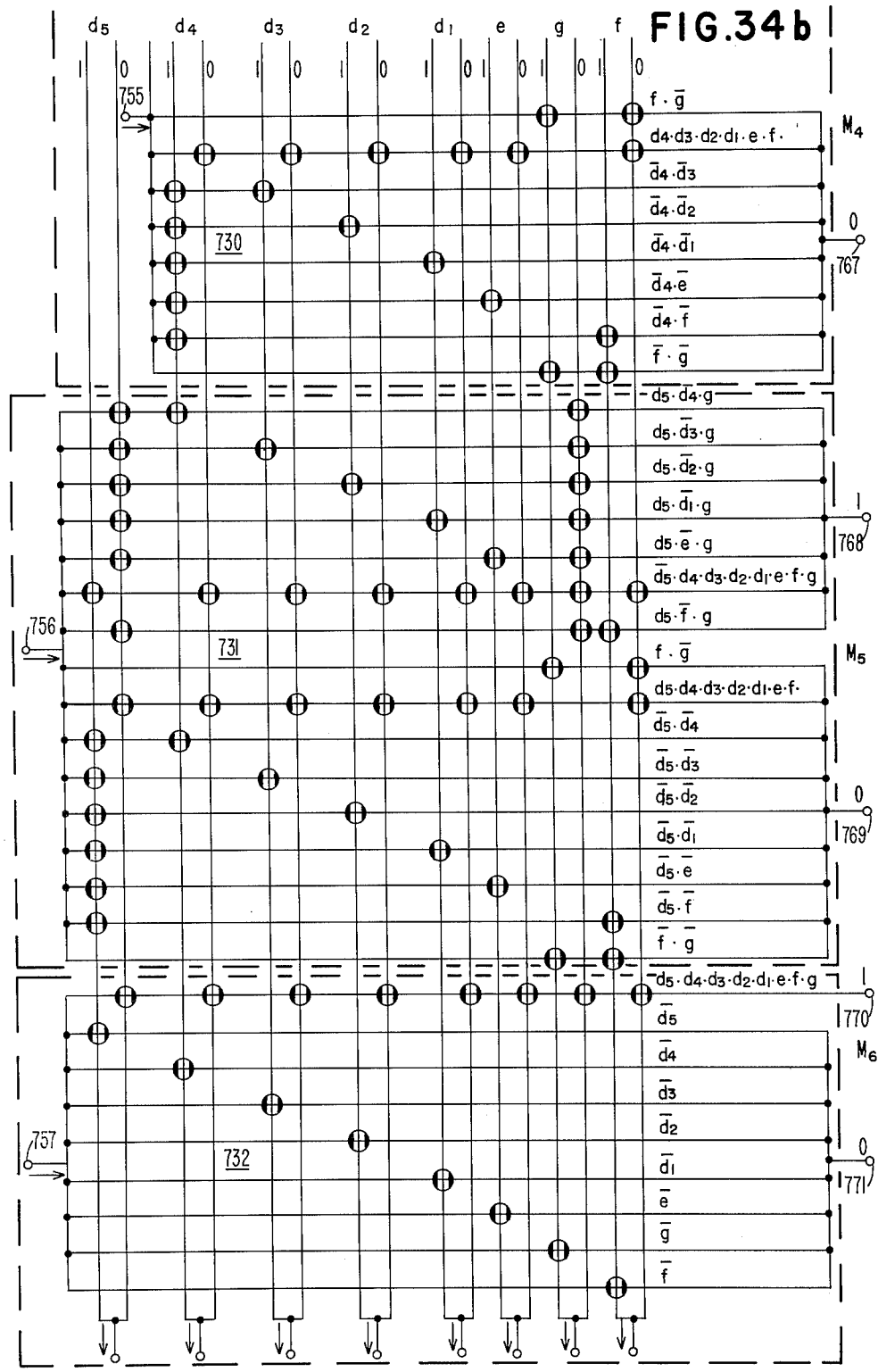

United States Patent Office 3,230,354
Patented Jan. 18, 1966

3,230,354
MULTI-LEVEL ADDER ARRANGEMENT
Eric G. Wagner, New York, N.Y., assignor to International Business Machines Corporation, New York, N.Y., a corporation of New York
Filed July 29, 1960, Ser. No. 46,271
8 Claims. (Cl. 235—164)

This invention relates to arithmetic devices and more particularly to the use of add-one circuits in such devices.

In arithmetic devices for performing addition, subtraction, multiplication and division operations various types of arrangements have been employed. In many arrangements where a plurality of stages are employed, it is customary to find that the stages are substantially identical in construction, and in many cases the adder construction provides carry signals which ripple from the lower order stages to the higher order stages. The time required to perform an arithmetic operation varies as a function of the number of carry signals which ripple from the lower order stages to the high order stages. Control signals for operating such arithmetic devices may involve rather complex timing problems, especially where it is important to save time, and an add operation is indefinite in duration because carry signals ripple from low order stages to the high order stages.

This invention provides an arithmetic device which minimizes the timing problem for control signals and which alleviates the problem of carry signals rippling through the adder. Furthermore, the number of levels required for the construction of a given arithmetic device employing add-one circuits may be reduced to a minimum.

An add-one circuit is provided according to this invention which adds a first number $A=a_n, a_{n-1}, \ldots, a_2, a_1$ to a second number $b$ consisting of a single digit. If the binary system of notation is employed, the number $b$ may be zero or one. In case $b$ is zero, the value of $A$ is unchanged by the add operation. If $b$ is one, then the value of $A$ is increased by one as a result of the add operation. Accordingly, an add-one circuit provides the sum of $b$ and $a_n, a_{n-1}, \ldots, a_2, a_1$. The number of inputs to the add-one circuit is $n+1$ and the number of outputs from the add-one circuit is usually $n$ although the number of outputs may be $n+1$ where required. The $n+1$ output is usually a carry over, but it is not required in many instances when add-one circuits are employed in the construction of an adder circuit or multiplier device. As explained more fully hereinafter, successive carries in an adder are handled in a novel fashion by the use of add-one circuits.

Add-one circuits may be employed according to this invention to construct an adder arrangement, and add-one circuits plus additional circuits which are variations of the add-one circuit may be employed to construct a multiplier device. The design of such devices is relatively simple. The number of levels (circuit blocks through which signals must pass in order to generate a sum or product) may be kept to a minimum in order to complete an arithmetic operation in the least amount of time.

It is a feature of this invention to provide an add-one circuit which is unique and novel in its construction and operation and which responds to signals representative of a first number $a_n, a_{n-1}, \ldots, a_2, a_1$ and a second number $b$ to provide output signals $c_n, \ldots, c_2, c_1$ with or without $c_{n+1}$ representative of the sum of the first and second numbers.

It is another feature of this invention to provide a novel adder which is constructed from add-one circuits and responds to signals representative of two numbers $A=a_n, a_{n-1}, \ldots, a_2, a_1$ and $B=b_n, b_{n-1}, \ldots, b_2, b_1$ and provides output signals representative of a sum $C=c_{n+1}, c_n, \ldots, c_2, c_1$.

It is another feature of this invention to provide a novel multiplier which is constructed from add-one circuits and circuits which are variations of the add-one circuit. The multiplier responds to signals representing a number $A=a_n, a_{n-1}, \ldots, a_2, a_1$ and a number $B=b_n, b_{n-1}, \ldots, b_2, b_1$ to provide output signals representing a product $P=p_n, \ldots, p_2, p_1$.

Figure 2:
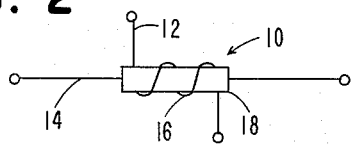
Figure 3:
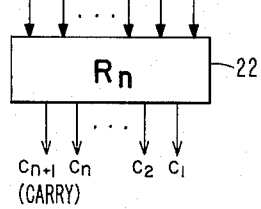
Figure 4:
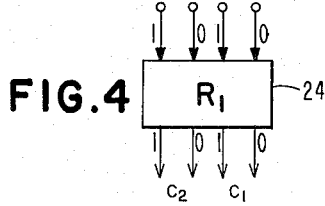
Figure 6:
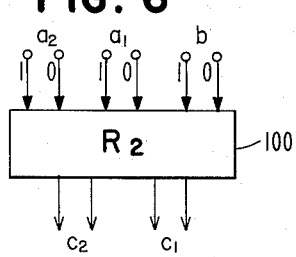
Figure 5:
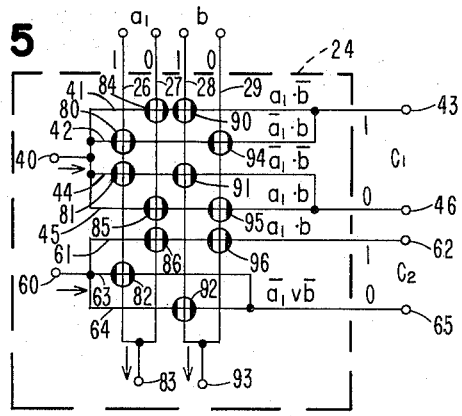
Figure 7:
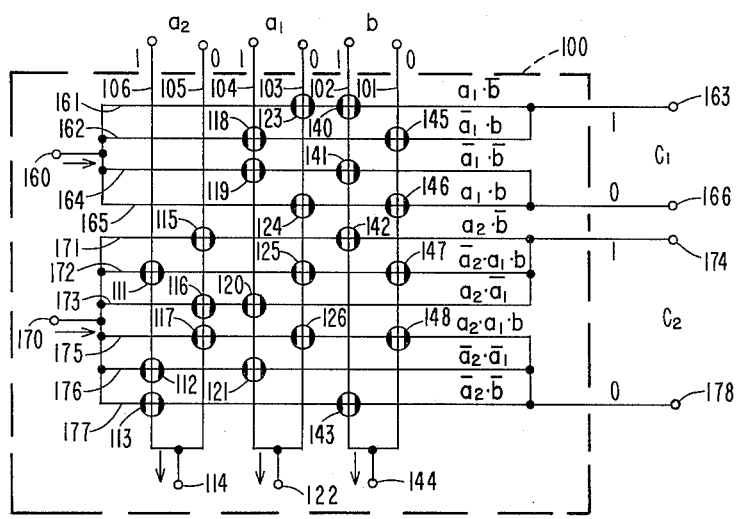
Figure 9:
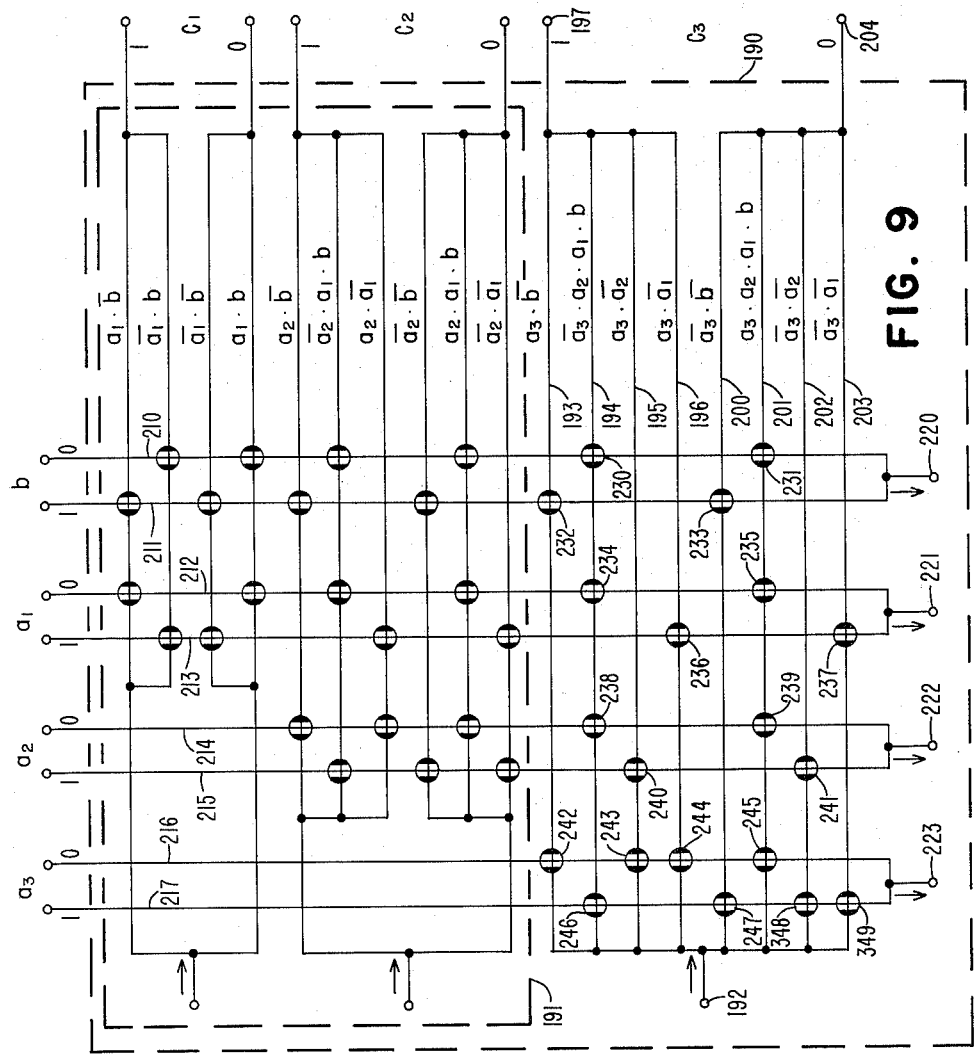
Figure 8:
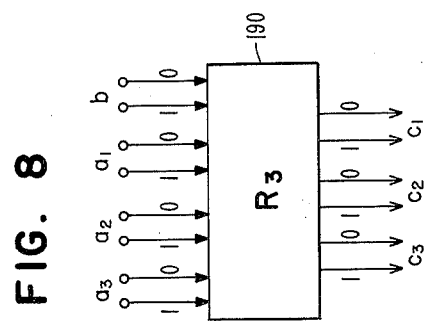
Figure 11:
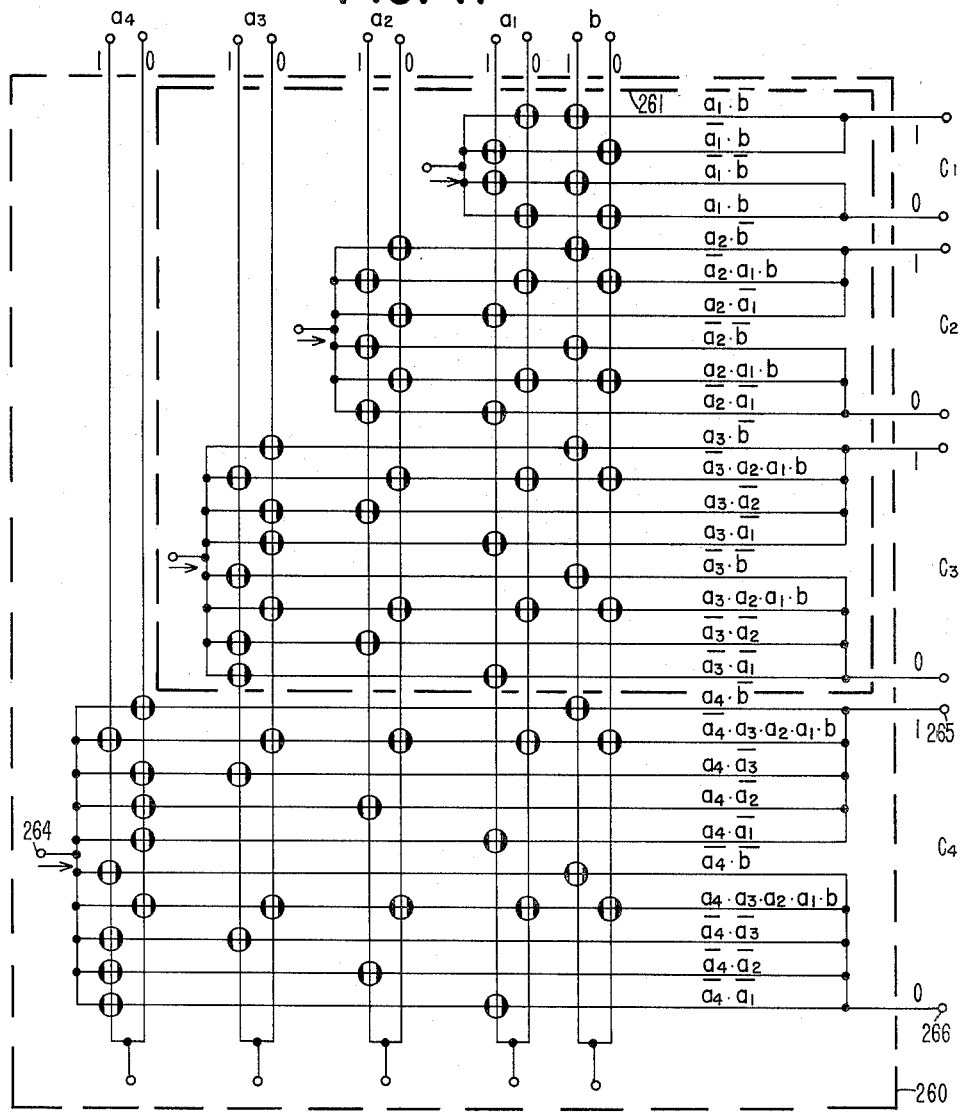
Figure 10:
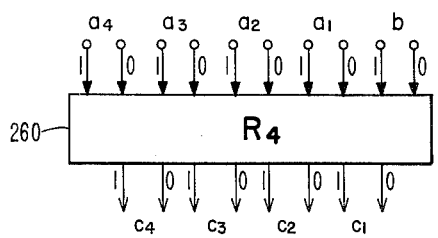
Figure 12:
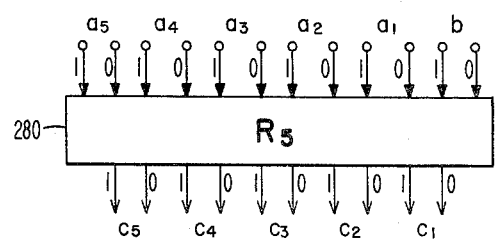
Figure 16:
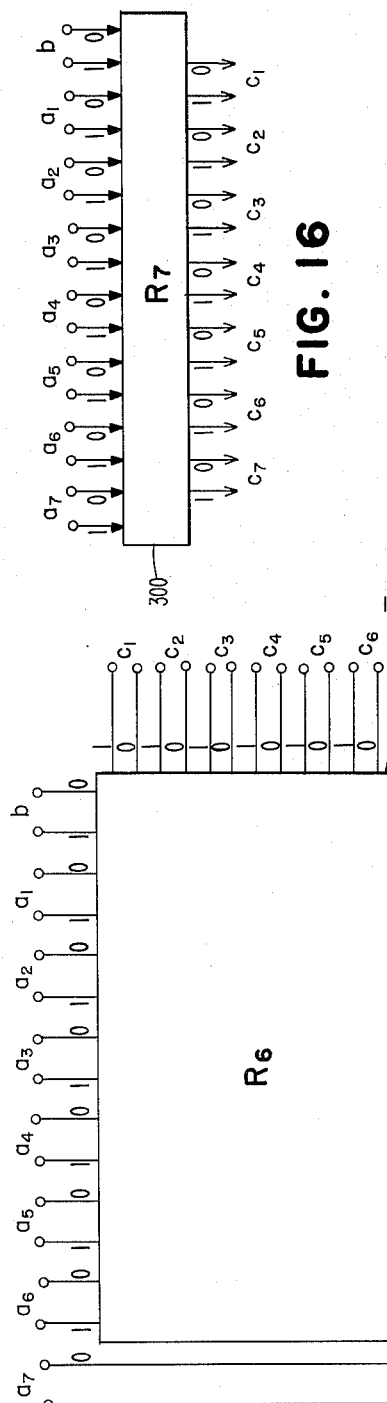
Figure 17:
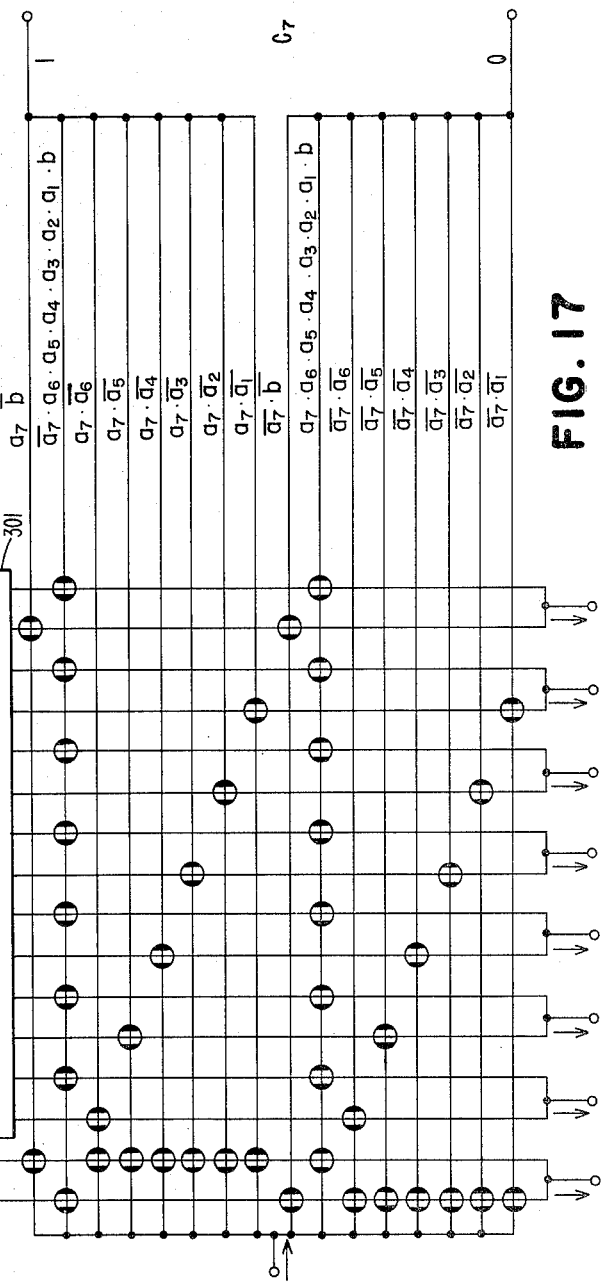
Figure 19:
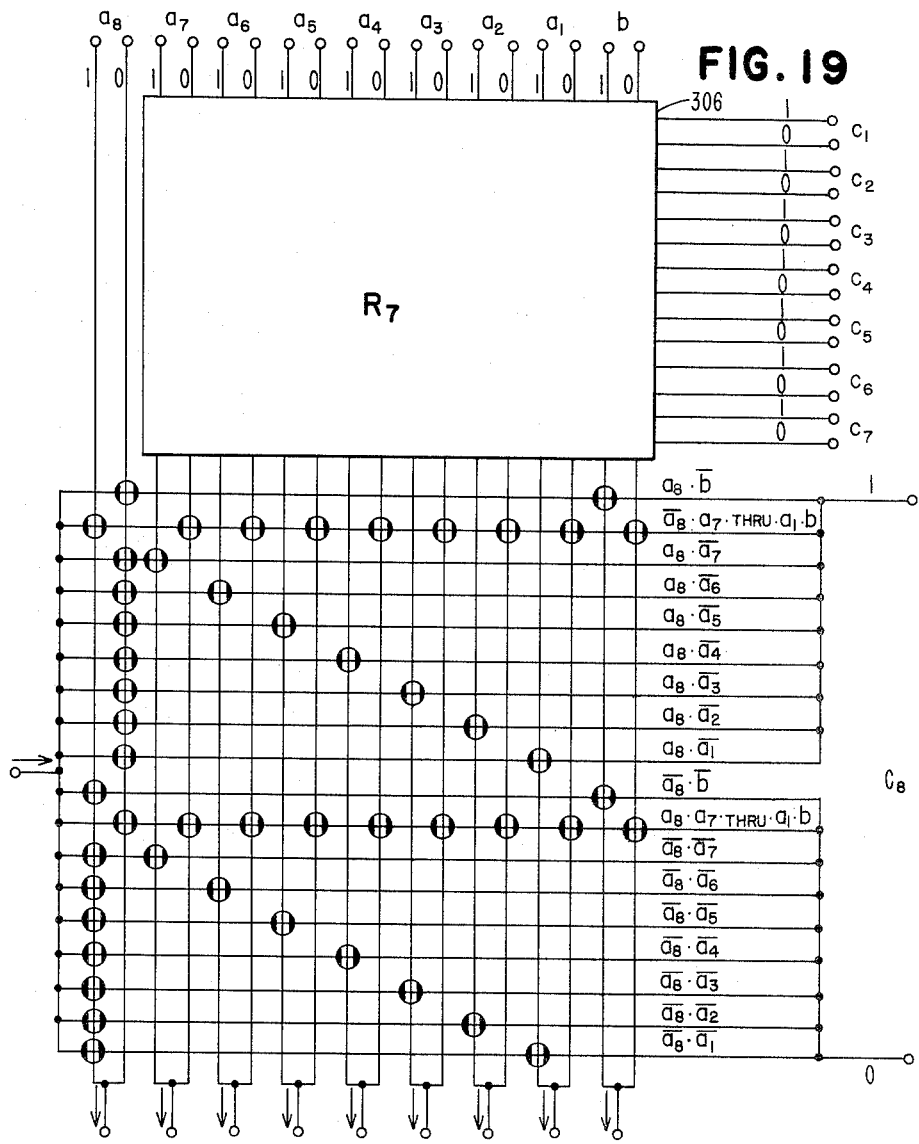
Figure 18:
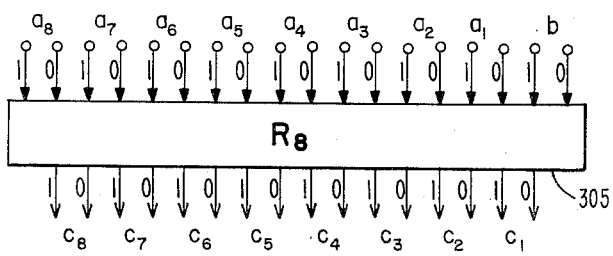
Figures 20, 21:
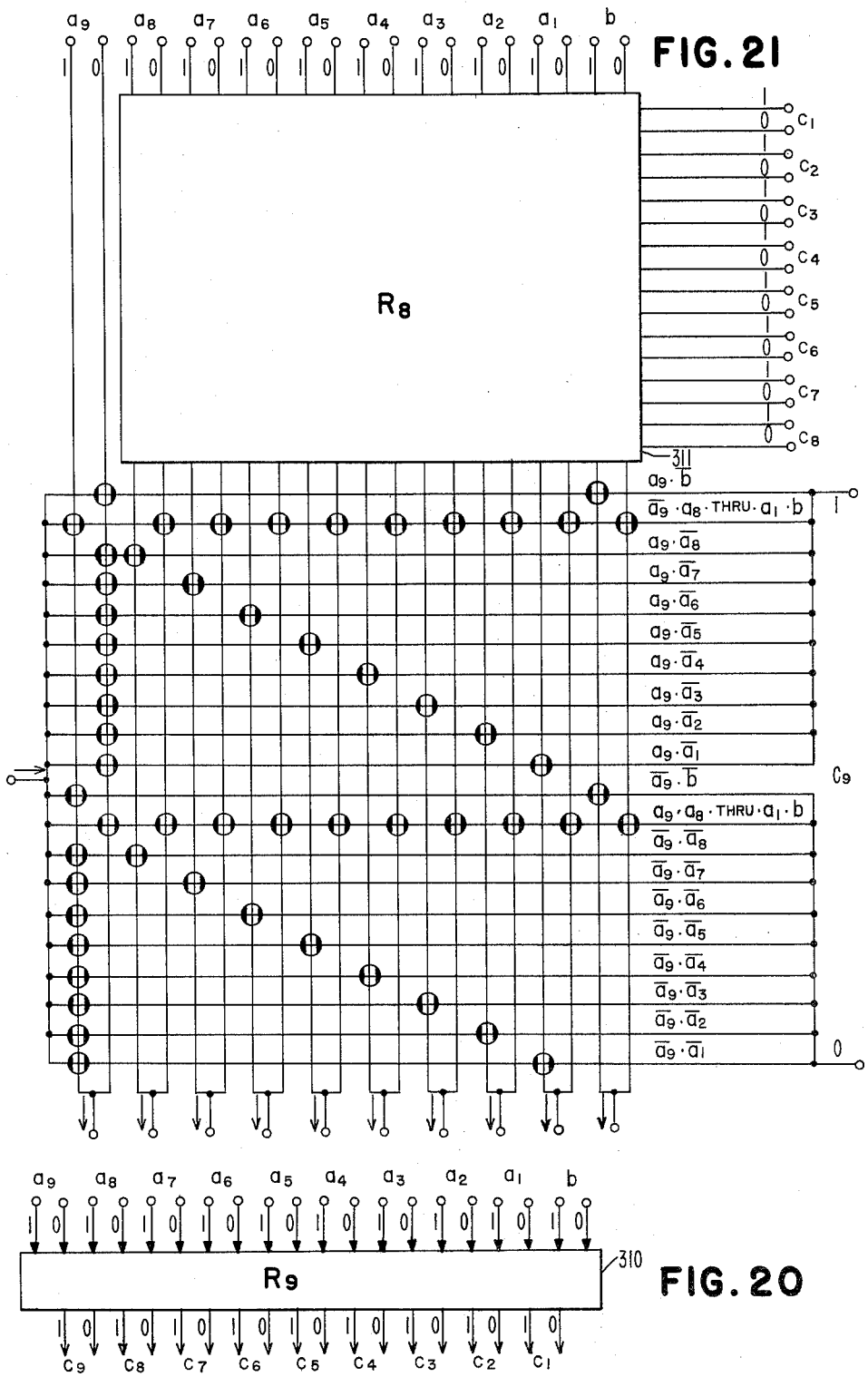
Figure 22:
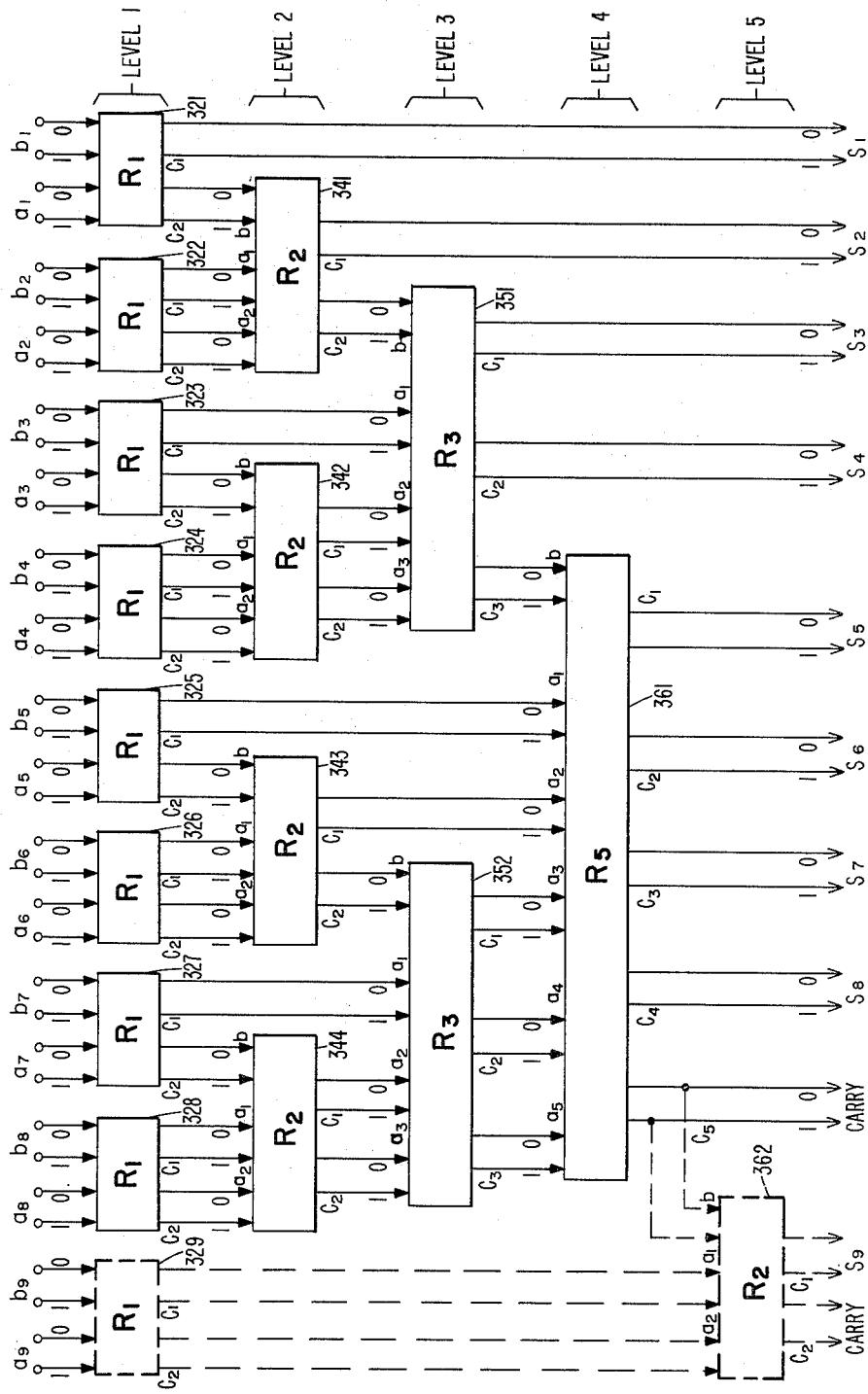
Figure 27:
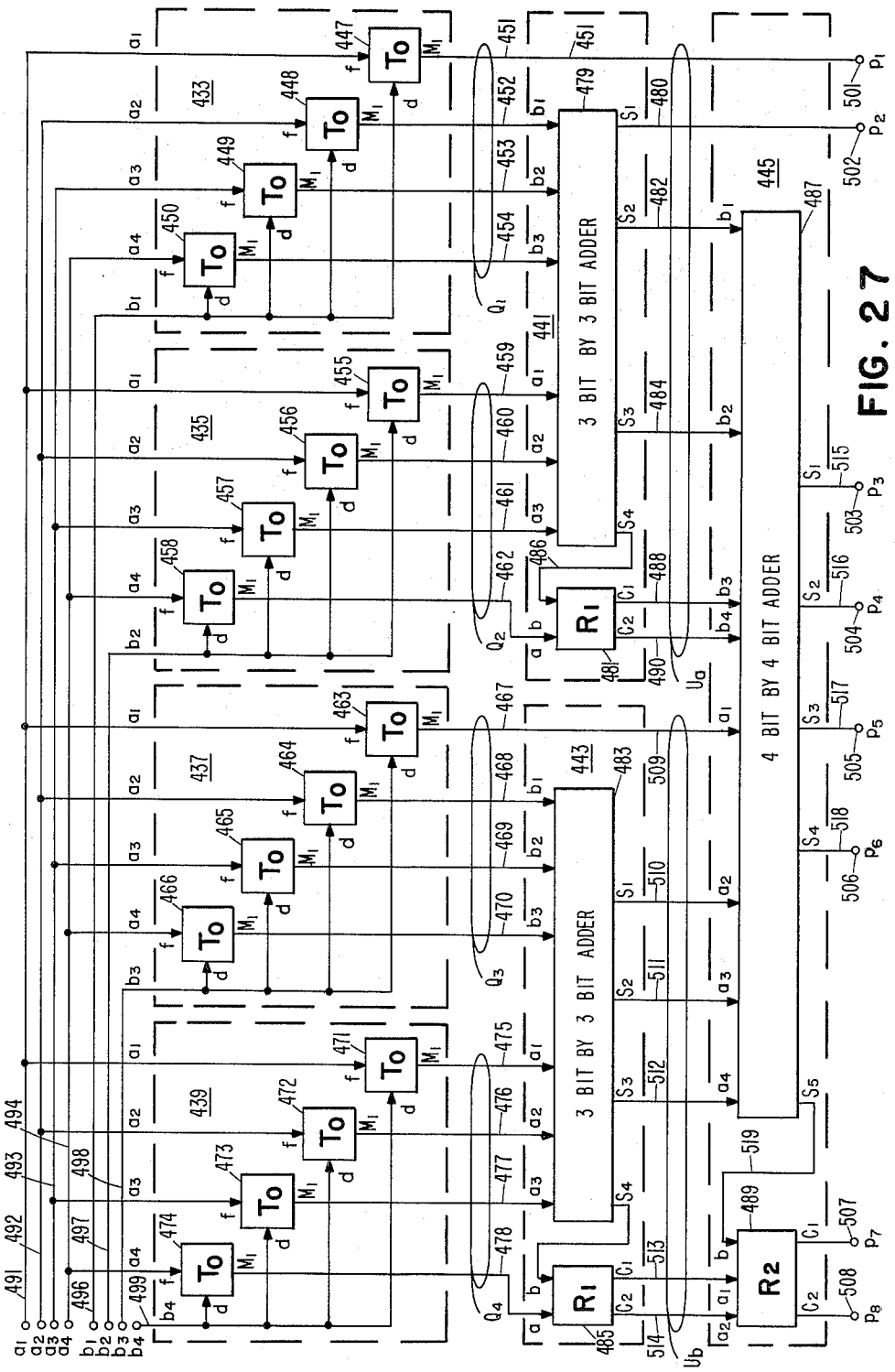
Figure 28:
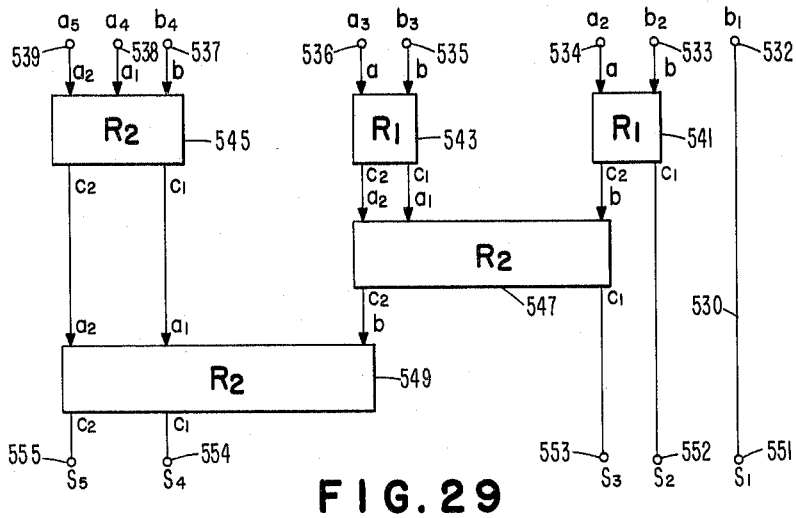
Figure 29:
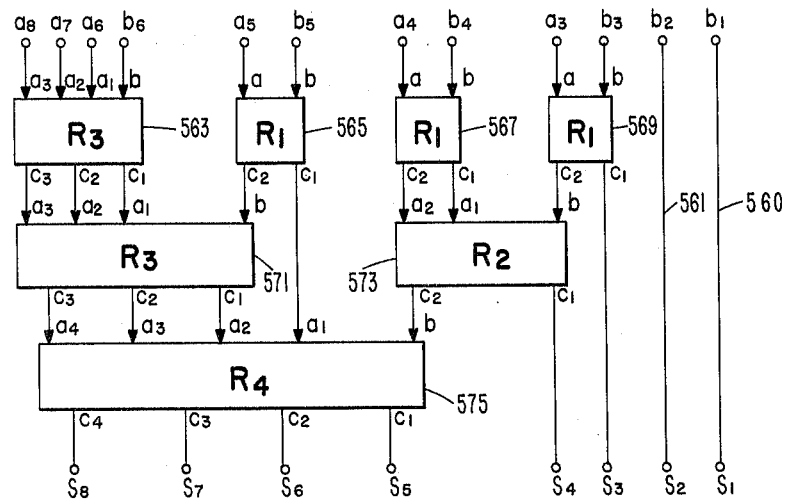
Figure 30H:
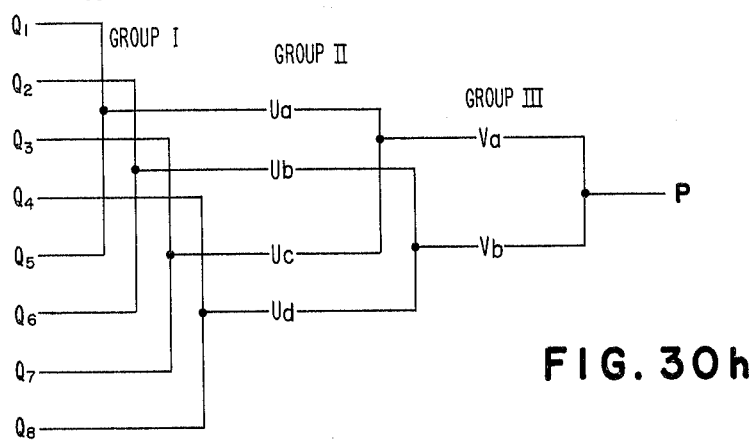
Figure 34A:
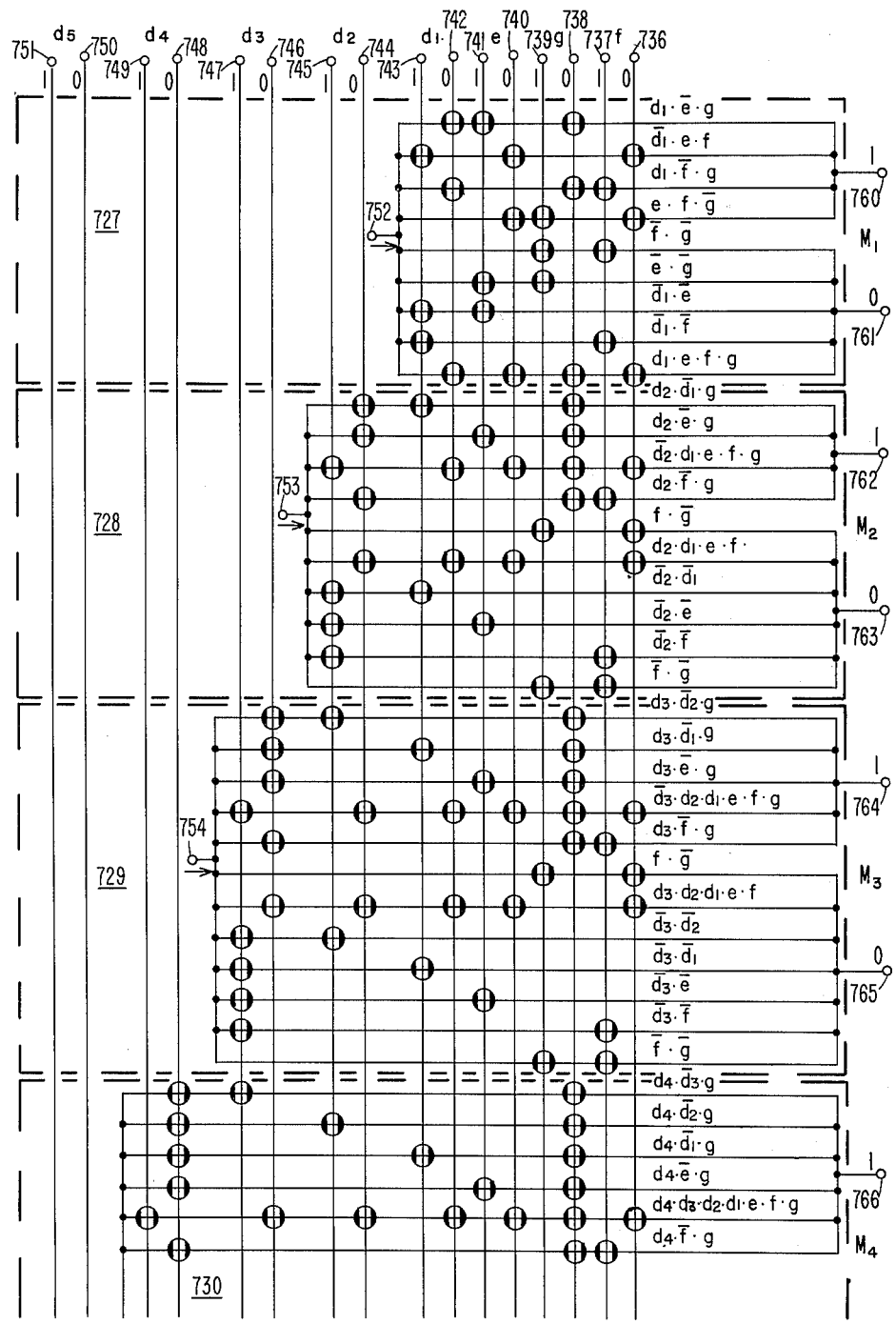
Figure 35:
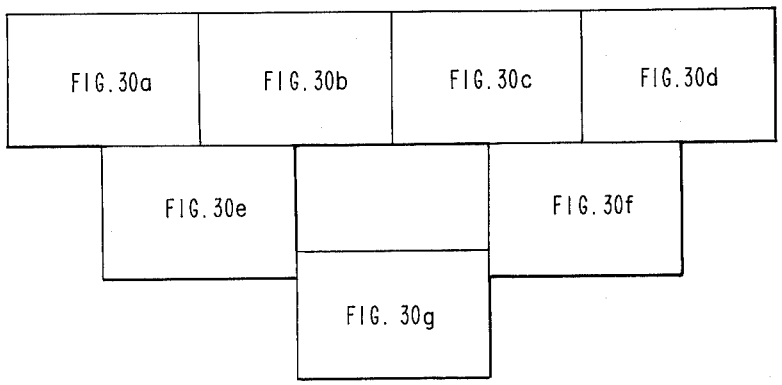
Figure 36:
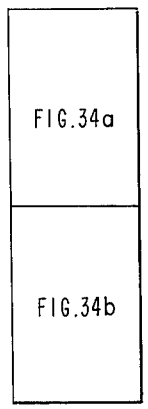

These and other features of this invention may be more fully appreciated when considered in the light of the following specification and the drawings in which:

FIG. 1 illustrates a symbol which is used throughout various figures of the drawings to represent an inhibitor;
FIG. 2 illustrates a circuit schematic for a cryotron which may be employed as an inhibitor;
FIG. 3 illustrates an $R_n$ add-one circuit in block form;
FIG. 4 illustrates an $R_1$ add-one circuit in block form;
FIG. 5 illustrates an $R_1$ add-one circuit in detail;
FIG. 6 illustrates an $R_2$ add-one circuit in block form;
FIG. 7 illustrates an $R_2$ add-one circuit in detail;
FIG. 8 illustrates an $R_3$ add-one circuit in block form;
FIG. 9 illustrates an $R_3$ add-one circuit in detail;
FIG. 10 illustrates an $R_4$ add-one circuit in block form;
FIG. 11 illustrates an $R_4$ add-one circuit in detail;
FIG. 12 illustrates an $R_5$ add-one circuit in block form;
FIG. 13 illustrates an $R_5$ add-one circuit in detail;
FIG. 14 illustrates an $R_6$ add-one circuit in block form;
FIG. 15 illustrates an $R_6$ add-one circuit in detail;
FIG. 16 illustrates an $R_7$ add-one circuit in block form;
FIG. 17 illustrates an $R_7$ add-one circuit in detail;
FIG. 18 illustrates an $R_8$ add-one circuit in block form;
FIG. 19 illustrates an $R_8$ add-one circuit in detail;
FIG. 20 illustrates an $R_9$ add-one circuit in block form;
FIG. 21 illustrates an $R_9$ add-one circuit in detail;
FIG. 22 illustrates in block form an adder constructed from add-one circuits;
FIG. 23 illustrates the multiplication process;
FIG. 24 illustrates the grouping of partial products;
FIG. 25 illustrates a $T_0$ multiplier circuit in block form;
FIG. 26 illustrates a $T_0$ multiplier circuit in detail;
FIG. 27 illustrates in block form a multiplier constructed from multiplier circuits and add-one circuits;
FIGS. 27a through d illustrate the manner in which multiplication is carried out in the multiplier illustrated in FIG. 27;
FIG. 28 illustrates in block form an adder constructed from add-one circuit which may be used in the multiplier of FIG. 27;
FIG. 29 illustrates in block form a larger adder constructed from add-one circuits which may be used in the multiplier of FIG. 27.
FIGS. 30a through 30g illustrate in block form another embodiment of multiplier constructed from multiplier circuits and add-one circuits;
FIG. 30h illustrates the addition of partial products in the multiplier illustrated in FIGS. 30a through 30g;
FIG. 31 illustrates a $T_1$ multiplier circuit in block form;
FIG. 32 illustrates a $T_1$ multiplier in detail;
FIG. 33 illustrates a $T_5$ multiplier circuit in block form;
FIGS. 34a and 34b illustrate a $T_5$ multiplier circuit in detail; and
FIGS. 35 and 36 illustrate how FIGS. 30a through g and FIGS. 34a and b, respectively, fit together.

An add-one circuit according to this invention is a flexible device which may take numerous forms in practice. It is adaptable to numerous types of circuit components, but it is especially suitable for use with cryotrons and other cryogenic devices. The invention is illustrated herein with the use of cryotrons, but it is to be understood that the invention is not limited to cryotrons or cryogenic devices since other types of circuit components may be equally well employed.

The construction of an add-one circuit according to this invention is illustrated with cryogenic devices which may be disposed in rectangular arrays of the type illustrated and described in copending application Serial No. 18,692 filed on March 30, 1960 by Raymond E. Miller et al. for Inhibitor Logic Arrays, now Patent 3,175,197.

Reference is made to FIG. 1 wherein the symbol for an inhibitor 10 is illustrated. If current of a given magnitude flows on the vertical wire 12, a resistive condition is established in the horizontal line 14. If no current flows on the vertical wire 12 or if the current on the vertical wire 12 is less than a given magnitude, all portions of the horizontal line 14 assume the superconductive state. If the inhibitor 10 of FIG. 1 is a cryotron, its equivalent circuit may be that shown schematically in FIG. 2. Like numbers are employed in FIGS. 1 and 2 to show the correspondence of parts. The cryotron 10 in FIG. 2 includes a coil 16 in the vertical line 12 which is disposed about a gate element 18 positioned in the horizontal line 14. If current equal to or greater than the critical current of the gate element 18 flows along the vertical line 12, a resistive condition is established in the gate element 18. If current in the vertical line 12 is zero or any magnitude less than the critical current of the gate element 18, then the gate element 18 assumes the superconductive state. The symbol of an inhibitor illustrated in FIG. 1 is used throughout various figures of the drawing to represent a cryotron or other suitable type of inhibitor circuit. While the cryotron illustrated in FIG. 2 is represented as a convenient wire-wound cryotron in the interest of providing a more graphic circuit illustration, it is to be understood the cryotron may be constructed of thin film devices of the type shown and described in copending application Serial No. 625,512 filed on November 30, 1956, by R. L. Garwin and assigned to the assignee of this invention.

The circuits of this invention are operated at low temperatures such as by immersion in liquid helium. Circuit lines or wires and the control coils of each cryotron are made of a hard superconductor such as niobium, and the gate element of each cryotron is made of a soft superconductor such as tantalum. The currents employed create a magnetic field in the control coil which exceeds the critical field of the gate element, but the magnetic field does not exceed the critical field of the control coil or the connecting lines or wires. Accordingly, the gate element of the cryotron is driven resistive when current equal to or greater in magnitude than critical current flows in the control coil of the cryotron, and the gate element is superconductive when no current or current of magnitude less than critical current of the gate element flows in the control coil.

FIG. 3 shows an add-one circuit illustrated in block form. An add-one circuit may be defined as a circuit which adds a first number $A = a_n, \ldots, a_2, a_1$ to a second number $b$ where $A$ may have any number of digits and $b$ is limited to a single digit. The add-one circuit 22 in FIG. 3 represents a general case as designated by the symbol $R_n$. The letter R signifies an add-one circuit, and the letter $n$ indicates the type. The add-one circuit 22 receives a first number A which is represented by inputs labeled $a_n, a_{n-1}, \ldots, a_2, a_1$ and adds a single digit number $b$ thereto. The sum of A and B is provided by the add-one circuit 22 on outputs labeled $c_{n+1}, c_n, c_{n-1}, \ldots, c_2, c_1$. The outputs $c_1, c_2, \ldots, c_n$ and $c_{n+1}$ may be expressed in terms of the inputs $a_n, a_{n-1}, \ldots, a_2, a_1$ and $b$. In the binary system of notation the relationships are as indicated in Table I below.

TABLE I $c_1 = (a_1\bar{b}) \vee (\bar{a}_1 b) = 1$
$\bar{c}_1 = (a_1 b) \vee (\bar{a}_1 \bar{b}) = 0$ $c_i = (a_i\bar{b}) \vee (\bar{a}_i a_{i-1}, \ldots, a_1 b) \vee (a_i \bar{a}_{i-1})$
$\quad \vee (a_i \bar{a}_{i-2}), \ldots, (a_i \bar{a}_2) \vee (a_i \bar{a}_1) = 1$
$\bar{c}_i = (a_i b) \vee (\bar{a}_i a_{i-1}, \ldots, a_1 b) \vee (a_i \bar{a}_{i-1})$
$\quad \vee (a_i \bar{a}_{i-2}), \ldots, (a_i \bar{a}_2) \vee (a_i \bar{a}_1) = 0$ $c_{n+1} = a_n a_{n-1}, \ldots, a_2 a_1 b = 1$
$\bar{c}_{n+1} = a_n a_{n-1}, \ldots, a_2 a_1 b = 0$ In some applications an $R_n$ add-one circuit $R_n$ employs only $n$ outputs, in which case the most significant or carry over bit $c_{n+1}$ is not used. The number of output varies as a function of the number of inputs. Table II below illustrates the relationship the input quantities A and $b$ bear to the output quantities $c_1$ through $c_{10}$. These values are derived from Table I above.

TABLE II $c_1 = (a_1\bar{b}) \vee (\bar{a}_1 b)$ $\bar{c}_1 = (\bar{a}_1\bar{b}) \vee (a_1 b)$ $c_2 = (a_2\bar{b}) \vee (\bar{a}_2 a_1 b) \vee (a_2 \bar{a}_1)$
$\bar{c}_2 = (\bar{a}_2\bar{b}) \vee (a_2 a_1 b) \vee (\bar{a}_2 \bar{a}_1)$ $c_3 = (a_3\bar{b}) \vee (\bar{a}_3 a_2 a_1 b) \vee (a_3 \bar{a}_2) \vee (a_3 \bar{a}_1)$
$\bar{c}_3 = (\bar{a}_3\bar{b}) \vee (a_3 a_2 a_1 b) \vee (\bar{a}_3 \bar{a}_2) \vee (\bar{a}_3 \bar{a}_1)$ $c_4 = (a_4\bar{b}) \vee (\bar{a}_4 a_3 a_2 a_1 b) \vee (a_4 \bar{a}_3) \vee (a_4 \bar{a}_2) \vee (a_4 \bar{a}_1)$
$\bar{c}_4 = (\bar{a}_4\bar{b}) \vee (a_4 a_3 a_2 a_1 b) \vee (\bar{a}_4 \bar{a}_3) \vee (\bar{a}_4 \bar{a}_2) \vee (\bar{a}_4 \bar{a}_1)$ $c_5 = (a_5\bar{b}) \vee (\bar{a}_5 a_4 a_3 a_2 a_1 b) \vee (a_5 \bar{a}_4) \vee (a_5 \bar{a}_3) \vee (a_5 \bar{a}_2) \vee (a_5 \bar{a}_1)$
$\bar{c}_5 = (\bar{a}_5\bar{b}) \vee (a_5 a_4 a_3 a_2 a_1 b) \vee (\bar{a}_5 \bar{a}_4) \vee (\bar{a}_5 \bar{a}_3) \vee (\bar{a}_5 \bar{a}_2) \vee (\bar{a}_5 \bar{a}_1)$ $c_6 = (a_6\bar{b}) \vee (\bar{a}_6 a_5 a_4 a_3 a_2 a_1 b) \vee (a_6 \bar{a}_5) \vee (a_6 \bar{a}_4) \vee (a_6 \bar{a}_3) \vee (a_6 \bar{a}_2)$
$\quad \vee (a_6 \bar{a}_1)$
$\bar{c}_6 = (\bar{a}_6\bar{b}) \vee (a_6 a_5 a_4 a_3 a_2 a_1 b) \vee (\bar{a}_6 \bar{a}_5) \vee (\bar{a}_6 \bar{a}_4) \vee (\bar{a}_6 \bar{a}_3) \vee (\bar{a}_6 \bar{a}_2)$
$\quad \vee (\bar{a}_6 \bar{a}_1)$ $c_7 = (a_7\bar{b}) \vee (\bar{a}_7 a_6 a_5 a_4 a_3 a_2 a_1 b) \vee (a_7 \bar{a}_6) \vee (a_7 \bar{a}_5) \vee (a_7 \bar{a}_4) \vee (a_7 \bar{a}_3)$
$\quad \vee (a_7 \bar{a}_2) \vee (a_7 \bar{a}_1)$
$\bar{c}_7 = (\bar{a}_7\bar{b}) \vee (a_7 a_6 a_5 a_4 a_3 a_2 a_1 b) \vee (\bar{a}_7 \bar{a}_6) \vee (\bar{a}_7 \bar{a}_5) \vee (\bar{a}_7 \bar{a}_4) \vee (\bar{a}_7 \bar{a}_3)$
$\quad \vee (\bar{a}_7 \bar{a}_2) \vee (\bar{a}_7 \bar{a}_1)$ $c_8 = (a_8\bar{b}) \vee (\bar{a}_8 a_7 a_6 a_5 a_4 a_3 a_2 a_1 b) \vee (a_8 \bar{a}_7) \vee (a_8 \bar{a}_6) \vee (a_8 \bar{a}_5) \vee (a_8 \bar{a}_4)$
$\quad \vee (a_8 \bar{a}_3) \vee (a_8 \bar{a}_2) \vee (a_8 \bar{a}_1)$
$\bar{c}_8 = (\bar{a}_8\bar{b}) \vee (a_8 a_7 a_6 a_5 a_4 a_3 a_2 a_1 b) \vee (\bar{a}_8 \bar{a}_7) \vee (\bar{a}_8 \bar{a}_6) \vee (\bar{a}_8 \bar{a}_5) \vee (\bar{a}_8 \bar{a}_4)$
$\quad \vee (\bar{a}_8 \bar{a}_3) \vee (\bar{a}_8 \bar{a}_2) \vee (\bar{a}_8 \bar{a}_1)$ $c_9 = (a_9\bar{b}) \vee (\bar{a}_9 a_8 a_7 a_6 a_5 a_4 a_3 a_2 a_1 b) \vee (a_9 \bar{a}_8) \vee (a_9 \bar{a}_7) \vee (a_9 \bar{a}_6)$
$\quad \vee (a_9 \bar{a}_5) \vee (a_9 \bar{a}_4) \vee (a_9 \bar{a}_3) \vee (a_9 \bar{a}_2) \vee (a_9 \bar{a}_1)$
$\bar{c}_9 = (\bar{a}_9\bar{b}) \vee (a_9 a_8 a_7 a_6 a_5 a_4 a_3 a_2 a_1 b) \vee (\bar{a}_9 \bar{a}_8) \vee (\bar{a}_9 \bar{a}_7) \vee (\bar{a}_9 \bar{a}_6)$
$\quad \vee (\bar{a}_9 \bar{a}_5) \vee (\bar{a}_9 \bar{a}_4) \vee (\bar{a}_9 \bar{a}_3) \vee (\bar{a}_9 \bar{a}_2) \vee (\bar{a}_9 \bar{a}_1)$ $c_{10} = (a_{10}\bar{b}) \vee (\bar{a}_{10} a_9 a_8 a_7 a_6 a_5 a_4 a_3 a_2 a_1 b) \vee (a_{10} \bar{a}_9) \vee (a_{10} \bar{a}_8) \vee (a_{10} \bar{a}_7)$
$\quad \vee (a_{10} \bar{a}_6) \vee (a_{10} \bar{a}_5) \vee (a_{10} \bar{a}_4) \vee (a_{10} \bar{a}_3) \vee (a_{10} \bar{a}_2) \vee (a_{10} \bar{a}_1)$
$\bar{c}_{10} = (\bar{a}_{10}\bar{b}) \vee (a_{10} a_9 a_8 a_7 a_6 a_5 a_4 a_3 a_2 a_1 b) \vee (\bar{a}_{10} \bar{a}_9) \vee (\bar{a}_{10} \bar{a}_8) \vee (\bar{a}_{10} \bar{a}_7)$
$\quad \vee (\bar{a}_{10} \bar{a}_6) \vee (\bar{a}_{10} \bar{a}_5) \vee (\bar{a}_{10} \bar{a}_4) \vee (\bar{a}_{10} \bar{a}_3) \vee (\bar{a}_{10} \bar{a}_2) \vee (\bar{a}_{10} \bar{a}_1)$ Next the construction of add-one circuits of various sizes are described. The simplest case is where the number A has one digit. This case is illustrated in block form in FIG. 4 where an $R_1$ add-one circuit 24 receives input quantities $a_1$ and $b$ and supplies their sum on output lines $c_1$ and $c_2$. The circuit construction of the $R_1$ add-one circuit 24 in FIG. 4 is illustrated in detail in FIG. 5. The $a_1$ input to the add-one circuit 24 in FIG. 5 is supplied on lines 26 and 27. When $a_1$ is one, a current is applied to the line 26, and when $a_1$ is zero, a current is applied to the line 27. The $b$ input is applied on the lines 28 and 29. When $b$ is one, a current is applied to the line 28, and when $b$ is zero, a current is applied to the line 29. Current applied to a terminal 40 may flow along one of the lines 41 or 42 to an output terminal 43, or current from the terminal 40 may flow along one of the lines 44 or 45 to an output terminal 46. A current to the terminal 43 indicates that the value of $c_1$ is one. A current to the terminal 46 indicates that the value of $c_1$ is zero. Current from a terminal 60 may flow along a line 61 to a terminal 62, or current from the terminal 61 may flow along either one of the lines 63 or 64 to a terminal 65. A current to the terminal 62 indicates that the value of $c_2$ is one, and a current to the terminal 65 indicates that the value of $c_2$ is zero. Current on the vertical line 26 operates inhibitors 80, 81 and 82, and this current exits through a terminal 83. A current on the vertical line 27 operates inhibitors 84 through 86 and exits through the terminal 83. A current on the vertical line 28 operates inhibitors 90, 91 and 92 and exits through a terminal 93. A current on the vertical line 29 operates inhibitors 94, 95 and 96 and exits through the terminal 93.

In operation the add-one circuit 24 in FIG. 5 responds to combinations of signals applied to the $a_1$ and $b$ inputs and generates a combination of signals on the output circuit $c_1$ and $c_2$ representative of the sum $a_1$ and $b$. The mathematical expressions printed on the right-hand portion of the horizontal lines indicate what combination of $a_1$ and $b$ inputs cause these lines to be superconductive and available to carry current. For example, the expression $a_1\bar{b}$ indicates that whenever $a_1$ is one and $b$ is zero, the horizontal line 41 conveys a current from the terminal 40 to the terminal 43, thereby indicating that $c_1$ is one. Whenever $a_1$ is one, the vertical line 26 carries a current, and this operates the inhibitors 80, 81 and 82 which in turn drive resistive the gate elements disposed in respective horizontal lines 42, 44 and 63. Whenever $b$ is zero, current flows in the vertical line 29 and operates the inhibitors 94, 95 and 96 which in turn drive resistive the gate elements disposed in respective horizontal lines 42, 45 and 61. Current from the terminal 40 is diverted from the horizontal line 42 because the gates of the inhibitors 80 and 94 are resistive; this current is diverted from the horizontal line 44 because the gate element of the inhibitor 81 is resistive; and this current is diverted from the horizontal line 45 because the gate element of the inhibitor 95 is resistive. However, the line 41 presents a superconductive path because the inhibitors 84 and 90 are not operated, and the current from the terminal 40 flows along the line 41 to the exit terminal 43. Current to the terminal 43 indicates that the value of $c_1$ is one. Thus it is seen that the expression $a_1\bar{b}$ properly indicates that the horizontal line 41 has a current flowing therealong whenever the inputs are such that $a_1$ is one and $b$ is zero. It should be pointed out that current from the terminal 60 flows along the horizontal line 64 to the terminal 65 when $a_1$ is one and $b$ is zero. The remaining horizontal lines have a current flowing therealong whenever the expression indicated on the right-hand portion of these horizontal lines is satisfied by the input conditions.

If $a_1$ is one and $b$ is one, the sum in binary is 10. Therefore, $c_1$ is zero and $c_2$ is one. The quantities $c_1$ and $c_2$ represent a sum and a carry, respectively. Actually, the output $c_2$ is the $c_{n+1}$ output in Table I for the case were $A=a_1$; i.e., $c_{n+1}=a_1 b$ and $$\overline{c_{n+1}}=\overline{a_1 b}=\bar{a}_1 \vee \bar{b}.$$

The carry output is always used in an $R_1$ add-one circuit, but the cary output in $R_2, R_3, \ldots, R_n$ add-one circuits is not always used as may be more easily seen later when an adder circuit is described. Accordingly, no carry output is provided on $R_1, R_2, \ldots, R_n$ add-one circuits unless indicated otherwise.

Reference is made to FIG. 6 for a description of an $R_2$ add-one circuit 100 which is illustrated in block form as having inputs $a_1$, $a_2$ and $b$ with outputs $c_1$ and $c_2$. The $R_2$ add-one circuit 100 shown in block form in FIG. 6 is illustrated in detail in FIG. 7. The $b$ inputs are applied on vertical lines 101 and 102. The $a_1$ inputs are applied on vertical lines 103 and 104. The $a_2$ inputs are applied on vertical lines 105 and 106. Whenever $a_2$ is one, current flows on the vertical line 106, operates inhibitors 111 through 113 and then exits through the terminal 114. Whenever $a_2$ is zero, current flows on the vertical line 105, operates the inhibitor 115 through 117 and then exits through the terminal 114. Whenever $a_1$ is one, current flows on the vertical line 104, operates inhibitor 118 through 121 and then exits through the terminal 122. When $a_1$ is zero, current flows on the vertical line 103, operates inhibitors 123 through 126 and then exits through the terminal 122. When $b$ is one, current flows on the vertical line 102 and operates inhibitors 140 through 143 and then exits through the terminal 144. If $b$ is zero, current flows on the vertical line 101 and operates inhibitors 145 through 148 and then exits through the terminal 144. Current from the terminal 160 may flow along either one of the lines 161 or 162 to an output terminal 163, or current from the terminal 160 may flow along either one of the horizontal lines 164 or 165 to an output terminal 166. Current from a terminal 170 may flow along any one of the horizontal lines 171, 172 or 173 to an output terminal 174 or the current from the terminal 170 may flow along any one of the horizontal lines 175, 176 or 177 to an output terminal 178. If current flows to the output terminal 163, this indicates that $c_1$ is one. If current flows to the output terminal 166, this indicates that $c_1$ is zero. If current flows to the terminal 174, it indicates that $c_2$ is one; whereas, if current flows to the output terminal 178, it indicates that $c_2$ is zero.

The add-one circuit 100 in FIG. 7 adds the digit $b$ to the digits $a_2$, $a_1$. It is pointed out that if $b$ is one, $a_1$ is one and $a_2$ is one, then the maximum possible sum in binary is 100. In such a case the output $c_1$ is zero, but a third output which should be one is missing. Actually, the missing third output is $c_{n+1}$ which may be provided if desired. No circuitry is normally provided in the add-one circuit 100 of FIG. 7 for the missing third output since this add-one circuit is not normally employed in a situation where $b$, $a_1$ and $a_2$ each have the value of one. This will become more clear when the $R_2$ add-one circuit in FIG. 7 is employed in an adder that is described subsequently. The missing third output $c_{n+1}$ may be defined in terms of the inputs $a_1$, $a_2$ and $b$ as follows:

$$c_{n+1}=a_2 a_1 b \text{ and } \overline{c}_{n+1}=\bar{a}_2 \vee \bar{a}_1 \vee \bar{b}$$

Additional horizontal lines may be added in FIG. 7 to satisfy these functions if desired. The input conditions which cause current to flow in the horizontal lines 161 through 165 and 171 through 177 are defined by the mathematical expressions printed on the right-hand portion of these lines in FIG. 7. For example, the expression $a_2\bar{b}$ on the horizontal line 171 indicates that $c_2$ is one whenever $a_2$ is one and $b$ is zero.

For purposes of illustration let it be assumed that current flows on the vertical line 106 and another current flows on the vertical line 101, thereby representing the conditions that $a_2$ is one and $b$ is zero. It is immaterial in this instance whether $a_1$ is zero or one. The current on the vertical line 106 establishes a resistance in horizontal lines 172, 176 and 177 because respective inhibitors 111, 112 and 113 are operated. Current in the vertical line 101 operates the inhibitors 147 and 148, and they in turn establish resistance in respective horizontal lines 172 and 175. Accordingly, there is a resistance in each one of the horizontal lines 172 and 175 through 177. Current may flow from the terminal 170 through the superconductive paths defined by the horizontal line 171 or 173 to the terminal 174, thereby indicating that $c_2$ is one. In case $a_1$ is one, the inhibitor 120 is operated to establish a resistance in the horizontal line 173 in which case current from the terminal 170 must then flow through the horizontal line 171 to the exit terminal 174. Whenever $a_1$ is zero, the current from the terminal 170 may pass along either the horizontal line 171 or the horizontal line 173 to the terminal 174, or the current may divide itself between these two paths. In any event the horizontal line 171 offers a superconductive path for current to flow from the terminal 170 to the exit terminal 174 whenever $a_2$ is one and $b$ is zero. At the same time that the current flows from the terminal 170 to either the output terminal 174 or 178, a current from the terminal 160 flows either to the output terminal 163 or the output terminal 166. The manner in which the current from the terminals 160 and 170 are diverted to their associated output terminals is determined by the input conditions of $a_1$, $a_2$ and $b$. As indicated by the mathematical expression printed at the right on each horizontal line, the associated line is superconductive when the input conditions are satisfied.

FIG. 8 shows an $R_3$ add-one circuit in block form as having inputs $a_1$, $a_2$, $a_3$ and $b$ with three outputs labeled $c_1$, $c_2$ and $c_3$. The $R_3$ add-one circuit 190 shown in block form in FIG. 8 is illustrated in detail in FIG. 9. That portion of the add-one circuit 190 defined by the dotted line block 191 is the same in construction and operation as the $R_2$ add-one circuit illustrated in FIG. 7. Reference may be made to the description of FIG. 7 for an understanding of that portion of the add-one circuit 190 in FIG. 9 defined by the dotted line block 191. The $R_3$ add-one circuit 190 in FIG. 9 includes an $R_2$ add-one circuit when the dotted line block 191 plus an additional input $a_3$ and an additional output $c_3$. Current from a terminal 192 flows along one of the horizontal lines 193 through 196 to an output terminal 197, or current from the terminal 192 flows along one of the horizontal lines 200 through 203 to an output terminal 204. The $b$ input is applied on vertical lines 210 and 211. The $a_1$ input is applied on vertical lines 212 and 213. The $a_2$ input is applied on vertical lines 214 and 215, and the $a_3$ input is applied on vertical lines 216 and 217. Currents on the vertical lines 210 through 217 actuate the inhibitors disposed on these lines, and these currents exit through associated terminals 220 through 223. A current on the vertical line 210 operates the inhibitors 230 and 231, and a current on the vertical line 211 operates the inhibitors 232 and 233. These inhibitors are operated by the $b$ input. The inhibitors 234 through 237 are operated by the $a_1$ input. Current on the vertical line 212 operates the inhibitors 234 and 235; whereas, the current on the vertical line 213 operates inhibitors 236 and 237. The $a_2$ input operates inhibitors 238 through 241. Current on the vertical line 214 operates the inhibitors 238 and 239; whereas, current on the vertical line 215 operates the inhibitors 240 and 241. Inhibitors 242 through 249 are operated by the $a_3$ input. Current on the vertical line 216 operates the inhibitors 242 through 245, and current on the vertical line 217 operates the inhibitors 246 through 249. Current from the terminal 192 flows to the exit terminal 197 along at least one of the horizontal lines 193 through 196 whenever the conditions specified by the expression printed on the right-hand portion of horizontal lines 193 through 196 are satisfied by the inputs $a_1$, $a_2$, $a_3$ and $b$. In like fashion current from the terminal 192 flows to the output terminal 204 whenever the input conditions satisfy one of the expressions printed on the right-hand portion of the horizontal lines 200 through 203. The $c_3$ output is one whenever current flows to the exit terminal 197, and the $c_3$ output is zero whenever current flows to the exit terminal 204.

FIG. 10 shows an $R_4$ add-one circuit 260 in block form as having inputs $a_1$, $a_2$, $a_3$, $a_4$ and $b$ with outputs labeled $c_1$ though $c_4$. The details of the $R_4$ add-one circuit 260 are illustrated in FIG. 11. That portion of the $R_4$ add-one circuit 260 in FIG. 11 defined by the dotted line block 261 is the same in construction and operation as the $R_3$ add-one circuit 190 in FIG. 9. The $R_4$ add-one circuit in FIG. 11 includes an $R_3$ add-one circuit disposed within the dotted line block 261 plus an additional input $a_4$ and an additional output $c_4$. Current flows from a terminal 264 to either one of output terminals 265 or 266 depending upon the condition of the inputs $a_1$ through $a_4$ and $b$ as indicated by the mathematical expressions printed on the right-hand portions of the horizontal lines. In view of the detailed description of the $R_1$, $R_2$ and $R_3$ add-one circuits, the operation and construction of the $R_4$ add-one circuit in FIG. 11 can be readily understood.

FIG. 12 illustrates an $R_5$ add-one circuit 280 in block form as having inputs $a_1$, $a_2$, $a_3$, $a_4$, $a_5$ and $b$ with outputs designated $c_1$, $c_2$, $c_3$, $c_4$ and $c_5$. The details of the $R_5$ add-one circuit 280 are illustrated in FIG. 13. The $R_5$ add-one circuit 280 in FIG. 13 includes an $R_4$ add-one circuit disposed within the dotted line block 281 plus an additional input $a_5$ and an additional output $c_5$. Current from a terminal 282 is diverted to an output terminal 283 or an output terminal 284 as a function of the inputs $a_1$ through $a_5$ and $b$ as indicated by the mathematical expressions printed on the right-hand portion of the horizontal lines associated with the output terminals 283 and 284. In view of the foregoing discussion of the $R_1$ through $R_4$ add-one circuits, the operation and construction of the $R_5$ add-one circuit in FIG. 13 can be readily understood.

An $R_6$ add-one circuit 290 is illustrated in block form in FIG. 14 as having inputs $a_1$ through $a_6$ and $b$ and outputs $c_1$ through $c_6$. As shown in detail in FIG. 15, the $R_6$ add-one circuit 290 includes an $R_5$ add-one circuit 291, illustrated in block form, and an additional input $a_6$ and an additional output $c_6$. It is clear from the mathematical expressions printed on the right-hand portions of the horizontal lines what combination of input signals must exist in order to get an output for $c_6$ equals one or $c_6$ equals zero.

In FIG. 16 an $R_7$ add-one circuit 300 is illustrated in block form as having inputs $a_1$ through $a_6$ and $b$ with outputs $c_1$ through $c_7$. As shown in detail in FIG. 17, the $R_7$ add-one circuit 300 includes an $R_6$ add-one circuit 301, in block form, with an additional input $a_7$ and an additional output $c_7$. The mathematical expressions printed on the right-hand portion of the horizontal lines indicate what input conditions causes output $c_7$ to equal one or zero.

In FIG. 18 an $R_8$ add-one circuit 305 is shown in block form as having inputs $a_1$ through $a_8$ and $b$ with outputs $c_1$ through $c_8$. The $R_8$ add-one circuit 305 is shown in detail in FIG. 19. It includes an $R_7$ add-one circuit 306, shown in block form, with an additional input $a_8$ and an additional output $c_8$. The mathematical expressions printed on the right-hand portion of the horizontal lines indicate what input conditions cause $c_8$ to equal one or zero.

In FIG. 20 an $R_9$ add-one circuit 310 is illustrated in block form as having inputs $a_1$ through $a_9$ and $b$ and outputs $c_1$ through $c_9$. The $R_9$ add-one circuit 310 is illustrated in detail in FIG. 21 as having an $R_8$ add-one circuit 311, in block form, plus an additional input $a_9$ and an additional output $c_9$. The mathematical expressions printed on the right-hand portion of the horizontal lines indicate what conditions cause $c_9$ to equal one or zero.

It is readily seen from the foregoing description of add-one circuits that the $R_n$ add-one circuit 22 in FIG. 3 may be expanded in size as the number of digits of any number A are expanded. The symbol R is used to designate an add-one circuit and $n$ indicates the number of digits in the number A. The number $n$ may be any number equal to or greater than one. It is noted that the number of outputs from an add-one circuit is usually $n$, but the $n+1$ output may be provided where required. It is always provided in the $R_1$ add-one circuit. From the foregoing description of add-one circuits it is readily seen that $R_{10}$, $R_{11}$ ... $R_n$ add-one circuits may be easily constructed.

An adder circuit for adding two $n$-bit numbers may be constructed by using only add-one circuits of various sizes. There is a wide degree of latitude in selecting what size of add-one circuits are to be employed in constructing an adder. An adder may be constructed with the object in mind of keeping the number of circuit components to a minimum, but this may involve using a relatively large number of levels. The greater the number of levels involved, the greater the amount of time required to perform an add operation since a delay is involved each time signals pass through each level. The term levels indicates the number of circuit blocks input signals must pass through before a final sum is generated. If an adder is constructed with the minimum number of levels, the size of the add-one circuits is usually increased, and the number of circuit components increases toward a maximum. The ideal arrangement is one where both the number of components and the number of levels are a minimum. However, it is sometimes necessary to make a choice between these two factors which choice may involve using a nominal amount of circuit components and using a nominal number of levels.

It is desirable in some instances to simplify the techniques of construction and provide an adder arrangement having a minimum number of levels. Such an adder may be constructed from standard parts, and it may be regular in form or symmetrical. An algorithm for such an arrangement may be stated as follows:

*Algorithm I*

*Step 1.*—Construct the first level using $R_1$ add-one circuits. The $i$th bits of the two $n$-bit numbers being added are fed into the two inputs designated $a_1$ and $b$ of the $i$th $R_1$ add-one circuit. It is arbitrarily assumed that the least significant bit is on the right, and the most significant bit is on the left. This completes the construction of the first level.

*Step 2.*—Construct level 2 and the remaining levels as follows: The level being formed may be referred to as level $j$. For reference purposes the add-one circuits in each level $j$ are arbitrarily numbered consecutively beginning with the first one at the right.

(a) Form any level $j$ by taking the leftmost output of the first add-one circuit in the $j-1$ level (the level preceding the level being formed) and all of the outputs of the second add-one circuit in the $j-1$ level (the circuit on the $j-1$ level to the left of the first add-one circuit) plus all the unconnected outputs of add-one circuits that have at least one output feeding the second add-one circuit of the $j-1$ level (these outputs come from levels $j-2$ and other preceding levels) and connecting these outputs as inputs to the first add-one circuit of the $j$ level. The leftmost output of the first add-one circuit in the $j-1$ level is connected as the $b$ input to the first add-one circuit in the $j$ level. The other inputs to the first add-one circuit in the $j$ level are connected in accordance with their order of appearance from the right to left as respective $a_1$, $a_2$, $a_3$, etc. inputs. An add-one circuit $R_r$ is employed for the first add-one circuit in level $j$ where $r$ is equal to the number of inputs less one.

(b) Form the second add-one circuit in the $j$ level by similarly connecting the outputs of the next two (third and fourth) unconnected add-one circuits from the left in the $j-1$ level as inputs to the second add-one circuit in the $j$ level. The remaining circuits of the $j$ level, if any, are formed by progressing to the left in like manner. If the number of add-one circuits in the $j-1$ level is odd, then disregard the leftmost add-one circuit of the $j-1$ level when forming the $j$ level. Subsequently, when forming the $j+1$ level consider the disregarded add-one circuit as being on the $j$ level.

(c) It is pointed out that the $R_1$ circuit in FIG. 5 includes a carry output which is designated $c_2$ in this figure. For an $R_n$ add-one circuit which is illustrated in FIG. 3, the carry output circuit is designated $c_{n+1}$. It is pointed out further that the add-one circuits $R_2$ through $R_9$ do not include a $c_{n+1}$ output, but this circuit may be provided in those instances where it is needed. The mathematical expression for the carry output circuit $c_{n+1}$ is given in Table I above. In case carry output circuits $c_{n+1}$ are provided in the add-one circuits in any level equal to or greater than 2, they are removed.

*Step 3.*—Form successive levels according to the procedure in (b) above until a level is formed which has a single add-one circuit and is such that there are no unconnected outputs from the preceding level to the left of this add-one circuit. This is the last level, and the adder is complete. The outputs of the adder which represent the final sum are the unconnected outputs of the various add-one circuits after all of the levels are formed. The least significant bit is on the right with higher order bits disposed successively in ascending order to the left.

When the foregoing algorithm is used to construct an adder for ading two numbers A and B, the number of levels required for the adder may be expressed as follows:

Equation 1 $\qquad L = -[-\log_2 n] + 1$ where $L$=the number of levels,
$n$=the number of digits, and
$-[-\log_2 n]$=the least integer greater than or equal to $\log_2 n$.

Where $n$ is a power of 2 the total number of add-one circuits in a given level $j$, when $j$ is equal to or greater than one, may be set forth as follows:

Equation 2 $\qquad W = \dfrac{n}{2^{j-1}}$ where $W$=the total number of add-one circuits employed in the given level,
$n$=the total number of digits of the largest of the two numbers A and B, and
$j$=the number of the level under consideration.

In those cases where $n$ is a power of 2, the $j$th level, when $j$ is equal to or greater than 2, is constructed of $R_r$ add-one circuits. The expression below may be used to determine $r$:

Equation 3 $\qquad r = 2^{j-2} + 1$ where $r$=the type of add-one circuit, and
$j$=a given level.

An adder for the case where $A_n$ and $B_n$ are to be added is shown in FIG. 22 where $n=8$. The adder is constructed from add-one circuits of various types. That portion of the adder in FIG. 22 drawn in solid lines indicates an adder for the case when $n=8$. The case where $n=9$ is also illustrated in FIG. 22 by the solid line portion of this figure plus the dotted line portion. It is noted that levels 1 through 5 are indicated at the right of FIG. 22. These levels indicate the number of blocks through which the input signals pass before a final sum is generated. It is pointed out that four levels are required for the case where $n=8$, and five levels are required for the case where $n=9$.

The construction of the adder in FIG. 22 is demonstrated by following the steps of algorithm I. The case for $n=8$ is considered first. According to step 1 of algorithm I above $R_1$ add-one circuits are employed in level 1. In FIG. 22 $R_1$ add-one circuits 321 through 328 are disposed in level 1. The inputs to these add-one circuits are $a_1$ through $a_8$ and $b_1$ through $b_8$ which are connected as shown to respective add-one circuits 321 through 328. This completes the construction of level 1 in FIG. 22.

Levels 2 through 4 in FIG. 22 are constructed according to step 2 of the foregoing algorithm. If Equation 1 is solved for L where $n=8$ which is the instant case, the result is $L=4$. This indicates that the number of levels for the adder in FIG. 22 for the case where $n=8$ is four levels. If Equation 2 above is solved for $n=8$ and $j=2$, the result is $W=4$. This indicates that there are four add-one circuits in level 2 of the adder in FIG. 22. If Equation 3 is solved for $r$ where $j=2$, the result is $r=2$. This indicates that the type of add-one circuits employed in level 2 are $R_2$ add-one circuits. Accordingly, Equations 2 and 3 indicate that four $R_2$ add-one circuits are employed in level 2 of an adder where $n=8$. The manner in which the output lines from the $R_1$ add-one circuits in level 1 are connected as inputs to the $R_2$ add-one circuits in level 2 is indicated by step 2a in the foregoing algorithm. According to step 2a the leftmost output of the first add-one circuit in the $j-1$ level and all of the outputs of the second add-one circuit in the $j-1$ level are connected as inputs to the first add-one circuit in the $j$ level. This indicates that the $c_2$ output of add-one circuit 321 in the first level is connected as the $b$ input to the add-one circuit 341 in the second level, and the $c_1$ and $c_2$ outputs of the second add-one circuit 322 in the first level are connected as respective $a_1$ and $a_2$ inputs to the first add-one circuit 341 in the second level. It is noted that there are no unconnected outputs from add-one circuits in the $j-2$ level in this instance. The second add-one circuit 342 in the second level has the leftmost output of the add-one circuit 323 and both of the outputs of the add-one circuit 324 connected as respective $b$, $a_1$ and $a_2$ inputs thereto. The $c_1$ output of the add-one circuit 323 passes through the second level as shown in FIG. 22. The add-one circuits 343 and 344 in the second level are connected with outputs of add-one circuits in the first level in a manner similar to that of the add-one circuits 341 and 342. This completes the construction of level 2 of the adder in FIG. 22.

In order to construct level $j$ where $j=3$, Equation 2 above is solved for $n=8$ and $j=3$. The total number of add-one circuits W is two. If Equation 3 above is solved for $r$ where $j=3$, the result is $r=3$. This indicates that $R_3$ add-one circuits should be used. It is accordingly determined from Equations 2 and 3 that two $R_3$ add-one circuits should be employed in level 3 of the adder in FIG. 22. The add-one circuits 351 and 352 in level 3 of the adder in FIG. 22 are connected as shown by following step 2a in the algorithm above. According to step 2a the leftmost output in the first add-one circuit of the $j-1$ level, all of the outputs of the second add-one circuit in the $j-1$ level and all of the unconnected outputs of add-one circuits in the $j-2$ level which have at least one output connected to the second add-one circuit in the $j-1$ level are connected as inputs to the first add-one circuit in the $j$ level. These inputs are connected to the first add-one circuit in the third level in accordance with their order of appearance from right to left as respective $b$, $a_2$ and $a_3$ inputs. It is seen therefore that the $c_2$ output of the $R_2$ add-one circuit 341 in level 2 is connected as the $b$ input to the $R_3$ add-one circuit 351 in level 3. The output $c_1$ of the $R_1$ add-one circuit 323 in level 1 is connected as the $a_1$ input of the $R_3$ add-one circuit 351 in level 3. The outputs $c_1$ and $c_2$ of the $R_2$ add-one circuit 342 in level 2 are connected as respective $a_2$ and $a_3$ inputs to the $R_3$ add-one circuit 351 in level 3. In like fashion the $c_2$ output of the $R_2$ add-one circuit 343, the $c_1$ output of the $R_1$ add-one circuit 327, the $c_1$ output of the $R_2$ add-one circuit 344 and the $c_2$ output of the $R_2$ add-one circuit 344 are connected as the respective $b$, $a_1$, $a_2$ and $a_3$ inputs to the $R_3$ add-one circuit 352 in level 3. The $c_1$ output of the $R_2$ add-one circuit 343 in level 2 and the $c_1$ output of the $R_1$ add-one circuit 325 in level 1 pass through level 3. This completes the construction of level 3 of the adder in FIG. 22.

If Equation 2 is solved for $j=4$ and $n=8$, the result is $W=1$. The result indicates that level 4 has a single add-one circuit. If Equation 3 above is solved for $j=4$, the result is $r=5$. Accordingly, the add-one circuit in level 4 is an $R_5$ add-one circuit. The $R_5$ add-one circuit 361 is connected in the fourth level as shown in FIG. 22 by following step 2a in algorithm I above. The leftmost output of the first add-one circuit in the $j-1$ level is the $c_3$ output of the $R_3$ add-one circuit 351 in level 3, and this output is connected as the $b$ input to the $R_5$ add-one circuit 361 in level 4. All of the outputs of the second add-one circuit in the $j-1$ level, as set forth in step 2a of the above algorithm, include the $c_1$ through $c_3$ outputs of the $R_3$ add-one circuit 352 in the third level, and these outputs are connected as respective $a_3$, $a_4$ and $a_5$ inputs of the $R_5$ add-one circuit 361 in level 4. The unconnected outputs of add-one circuits that have at least one output feeding the second add-one circuit of the $j-1$ level, as set forth in step 2a of the algorithm above, include the output $c_1$ of the $R_2$ add-one circuit 343 in the $j-2$ level, which is level 2 in this instance, and the output $c_1$ of the $R_1$ circuit 325 in the $j-3$ level, which is level 1 in this instance. It is pointed out that the $R_2$ add-one circuit 343 in level 2 has an output $c_2$ which feeds directly to the $R_3$ add-one circuit 352 which is the second add-one circuit in level $j-1$ which is level 3 in this instance, and the $R_1$ add-one circuit 325 in the $j-3$ level, which is level 1 in this instance, has an output $c_2$ which feeds directly into the add-one circuit 343 in level 2 and indirectly (through the add-one circuit 343) to the $R_3$ add-one circuit 352 in level 3. Thus the $c_1$ output of the $R_1$ add-one circuit 325 and the $c_1$ output of the $R_2$ add-one circuit 343 are connected as respective $a_1$ and $a_2$ inputs of the $R_5$ add-one circuit 361, and the outputs $c_1$, $c_2$ and $c_3$ outputs of the $R_3$ add-one circuit 352 are connected as respective $a_3$, $a_4$ and $a_5$ inputs of the $R_5$ add-one circuit 361. This completes the construction of level 4. Step 3 of the algorithm set forth above is satisfied when a level is reached which has a single add-one circuit and is such that there are no unconnected outputs from the preceding level to the left of this add-one circuit. The outputs of the adder which represent the final sum are the unconnected outputs of the various add-one circuits after all of the levels are formed. These outputs include the output $c_1$ of the add-one circuit 321, the output $c_1$ of the add-one circuit 341, the outputs $c_1$ and $c_2$ of the add-one circuit 351, and the outputs $c_1$ through $c_5$ of the add-one circuit 361, and these outputs constitute respective bits of the final sum $S_1$ through $S_8$ plus a carry bit which are disposed from right to left with the higher order bits disposed successively in ascending order to the left. Thus the construction of an adder for totaling two numbers of eight bits each is completed, and such an adder is represented by the solid line portion of FIG. 22.

The case considered next is the construction of an adder for adding two numbers $A_n$ and $B_n$ where $n$ is 9. Such an adder is illustrated in FIG. 22, and it includes both the solid line portion and the dotted line portion. Equations 2 and 3 above are not useful where $n$ is not a power of 2. Thus these equations are not useful for the case where $n=9$. However, Equation 1 above is useful, and if it is solved for L where $n=9$, the result is $L=5$. Thus five levels are required in order to construct an adder having the minimum number of levels where $n=9$.

In order to construct an adder of five levels where $n=9$, the foregoing algorithm is followed. The first level of the adder is constructed with $R_1$ add-one circuits as set forth in step 1 of the algorithm. Thus, nine add-one circuits are used in level 1, and the inputs $a_1$ through $a_9$ and $b_1$ through $b_9$ are connected to the $R_1$ add-one circuits 321 through 329 as shown in FIG. 22. Step 2 of the algorithm is used to construct levels 2 through 5 of the adder in FIG. 22 for the case where $n=9$. Level 2 is formed in the same manner as explained previously for the case where $n=8$. However, there are an odd number of $R_1$ add-one circuits in level 1, and according to step $2b$ of the algorithm, the add-one circuit 329 is disregarded when forming level 2. The add-one circuit 329 is regarded as being in level 2 when constructing level 3. Level 3 is constructed in the same manner as explained above for the case where $n=8$. However, the add-one circuit 329 is considered as being in level 2, and this makes an odd number of add-one circuits in level 2. Consequently, the add-one circuit 329 is disregarded when forming level 3, and it is considered as being in level 3 when level 4 is being formed. Level 4 is constructed in the same fashion as explained above for the case where $n=8$. Considering the add-one circuit 329 as being in level 3, this makes an odd number of add-one circuits in level 3, and the add-one circuit 329 is disregarded. The add-one circuit 329 is considered as being in level 4 when level 5 is formed. In order to construct level 5 according to step 2 of the algorithm, the leftmost output of the first add-one circuit in level 4 and all of the outputs of the second add-one circuit in level 4 are connected as inputs to the first add-one circuit in level 5. Accordingly, the $c_5$ output of the $R_5$ add-one circuit 361 is connected as the $b$ input to the $R_2$ add-one circuit 365 in level 5, and the $c_1$ and $c_2$ outputs of the $R_1$ add-one circuit 329 in level 1, now considered to be in level 4, are connected as respective $a_1$ and $a_2$ inputs to the $R_2$ add-one circuit 362 in level 5. The $c_1$ output of the add-one circuit 362 serves as the sum bit $s_9$, and the $c_2$ bit of this add-one circuit serves as the tenth bit of the sum which is a carry bit. The output $c_5$ of the add-one circuit 361 does not serve as a sum bit for the case where $n=9$ although it did so serve as a sum bit for the case where $n=8$. Accordingly, an adder for the case where $n=9$ is completed.

From the foregoing illustrations of adder construction for the cases where $n=8$ and $n=9$, it is seen how algorithm 1 above is utilized to construct an adder arrangement having a minimum number of levels. By following the steps of algorithm 1 an adder arrangement may be constructed of add-one circuits for any other value of $n$ to thereby provide an adder with a minimum number of levels. While algorithm 1 is a convenient way to construct an adder having a minimum number of levels, there are other adder arrangements which may provide the same minimum number of levels by using different size add-one circuits and this algorithm is given by way of example only.

Next, a multiplier constructed of add-one circuits is described, and other adder arrangements are considered. Before proceeding to the multiplier construction it is helpful to review the well known multiplication process in order to establish terms of reference for later use herein. FIG. 23 shows the multiplication process for deriving the product of A and B where A is the multiplicand and B is the multiplier. The multiplicand A consists of digits $a_n \ldots a_5, a_4, a_3, a_2, a_1$. The multiplier B consists of digits $b_n \ldots b_5, b_4, b_3, b_2, b_1$. The first partial product $Q_1$ is formed by multiplying the rightmost digit $b_1$ of the multiplier B by the *multiplicand* A. The first partial product $Q_2$ which is $a_n b_2 \ldots a_5 b_2, a_4 b_2, a_3 b_2, a_2 b_2, a_1 b_2$. $a_2 b_1, a_1 b_1$. The second partial product $Q_2$ is formed by multiplying the second digit $b_2$ of the multiplier B times the multiplicand A. This produces the second partial product $Q_2$ which is $a_n b_2 \ldots a_5 b_2, a_4 b_2, a_3 b_2, a_2 b_2, a_1 b_2$. The partial products $Q_2$ is placed beneath the partial product $Q_1$ and shifted one digit to the left because the multiplier digit $b_2$ is in the second digit position. It is seen that the rightmost digit of the partial product $Q_2$ is always a zero because of the shifting operation. In a similar manner the partial product $Q_3$ is formed by multiplying A by the multiplier digit $b_3$ and shifting two digit positions to the left. The partial products $Q_3$ always has zeroes in the two digit positions on the right. Partial products $Q_4$ and $Q_5$ are formed in like manner with three and four zeroes, respectively, in the rightmost digit positions. Additional partial products are formed until the last partial product $Q_t$ is formed. The partial product $Q_t$ is the product of the multiplier digit $b_n$ and the multiplicand A.

The product P is formed by adding the partial products $Q_1, Q_2, Q_3, Q_4, Q_5, \ldots, Q_t$. Addition of the various digits as they appear in the columns in FIG. 23 produces the digits $p_1, p_2, p_3, p_4, p_5, \ldots, p_{2n-1}, p_{2n}$.

Since an adder conveniently may combine two numbers at a time, two partial products may be added simultaneously. The addition of the partial products may be accomplished in accordance with algorithm 2 below:

*Algorithm 2*

(1) Separate the partial products $Q_1, Q_2, Q_3, \ldots, Q_n$ into $n/2$ sets of pairs if $n$ is an even number or into $(n-1)/2$ sets of pairs and one singlet if $n$ is odd. When a singlet is formed it is carried to the next level and treated as if it were a pair. If this first set of pairs contains more than two pairs, then form a second set of pairs in like manner. If the second set of pairs contains more than one pair, then the process is repeated until only one pair remains. Each pairing operation results in the formation of a separate level.

(2) Add together the partial products making up the pairs on the first level. The addition of the pairs on the first level produces $n/2$ or $(n-1)/2$ sums which form the pairs of the second level.

(3) Add together the sums obtained from step 2 in accordance with the pair groupings on the second level. Subsequent levels are added in accordance with the pair groupings in the respective levels until all additions have been completed. The final addition produces the desired product P.

The diagram in FIG. 24 shows a possible grouping of partial products $Q_1, Q_2, Q_3, \ldots, Q_n$, in accordance with algorithm 2. Level 1 is formed by grouping the partial products in pairs. The particular grouping shown is $Q_1$ with $Q_2$, $Q_3$ with $Q_4$, $Q_5$ with $Q_6$, $Q_7$ with $Q_8$, etc. Although the grouping shown combines adjacent partial products, other groupings are possible. For example, $Q_1$ could just as well be combined with any one of the partial products other than $Q_2$. Likewise other pairs can be formed by combining any two of the remaining partial products. There need not be any system to the grouping.

The addition of the pairs on level 1 produce the sums $U_a, U_b, U_c, U_d \ldots$ shown on level 2. These sums are formed in pairs and as shown $U_a$ is combined with $U_b$ and $U_c$ is combined with $U_d$. Again, it is pointed out that the pairs could be formed in any desired manner. The sums of the pairs on level 2 form the sums $V_a, V_b \ldots$. These sums are paired and added to form the sums for the following level. As shown, this continues until such time as a single sum appears. This single sum is then the desired product P.

Before realizing the above-described multiplier algorithms, it is necessary to develop a multiplier circuit. A simple multiplier circuit is designated $T_0$ and is shown in FIG. 25 in block form. The input $d$ is the multiplicand and the input $f$ is the multiplier. The output at $M_1$ is the product and whenever the multiplier $f$ is 0 the product $M_1$ is 0 regardless of what the multiplicand may be. If the multiplier $f$ is 1 then the multiplicand passes through the block $T_0$ to form the product $M_1$. Accordingly, when $f=1$ and $d=1$, then $M_1=1$, and when $f=1$ and $d=0$ then $M=0$. It is possible to perform this multiply operation by merely employing a two input AND circuit. It is noted that the only time the output $M_1$ is equal to 1 is when both the multiplier $f$ and the multiplicand $d$ are both equal to 1. A two input AND circuit performs this function since it produces an output only when both inputs receive a 1.

The details of circuit construction of the multiplier 400 shown in FIG. 25 is illustrated in FIG. 26. The $d$ input to the multiplier shown in FIG. 26 is applied to either of lines 401 or 403. When the $d$ input is 1 a current is supplied to the line 401, and when $d$ is 0 a current is supplied to the line 403. The $f$ input is applied to either of lines 405 or 407. When $f$ is 1 current is applied to line 405, and when $f$ is 0 current is applied to line 407. Current applied to terminal 415 may flow through line 409 and exit at terminal 425 or it may flow through either line 411 or 413 and exit at terminal 427. A current flowing to the terminal 425 indicates that $M_1$ has a value of 1. Current flow to the terminal 427 indicates that the value of $M_1$ is 0. Current on the vertical line 401 operates the inhibitor 417 and exits at the terminal 429. Current flow on the line 403 operates the inhibitor 419 and exits at the terminal 429. Current flow on the line 405 operates the inhibitor 421 and exits at the terminal 431. Current flow on the line 407 operates the inhibitor 423 and exits at the terminal 431.

The expressions printed on the right-hand portion of the horizontal lines indicate the combinations of $d$ and $f$ which cause current to flow to the associated terminal 425 or 427. For example, the expression $df$ which appears on the top horizontal line, indicates that when $d$ is 1 and $f$ is 1 current flows to the terminal 425. When $d$ is 1 current flows through the line 401 and operates the inhibitor 417 driving the gate element disposed in line 411 resistive. When $f$ is 1 current flows through the line 405 and operates the inhibitor 421 and drives the gate element disposed in horizontal line 413 resistive. Current from the terminal 415 is diverted from the horizontal lines 411 and 413 since the inhibitors 417 and 421 have resistive gate elements. Current from the terminal 415 does flow through the line 409 to the terminal 425 since the inhibitors 419 and 423 have not been operated. The expression $\bar{d}$ appearing on the horizontal line 411 indicates that current will flow to the terminal 427 whenever $d$ is 0. When $d$ is 0 current flows through the line 403 and operates the inhibitor 419 driving the gate element disposed in the line 409 resistive. Current flow from terminal 415 is diverted from line 409 since the gate element of inhibitor 419 is resistive. Current flow from the terminal 419 passes through either the line 411 or line 413 (depending on the value of $f$) and exits at terminal 427. The expression $\bar{f}$ indicates that whenever $f$ is 0 current flows to the line 427. When $f$ is 0 current flows down the line 407 driving the gate element of the inhibitor 423 resistive. Current flow from the terminals 415 is diverted from the line 409 because of the resistive gate element of the inhibitor 423. Current flow from terminal 415 flows through either line 411 or 431 (depending upon the value of $d$) and exits at terminal 427.

A multiplier may be built in accordance with the multiplier algorithm 2 by employing multiplier $T_0$ blocks as described in FIGS. 25 and 26, add-one circuits as described in FIGS. 3 through 21 and adders as described in connection with FIG. 22. An example of such a multiplier arranged to multiply a four-bit number by a four-bit number is shown in FIG. 27. FIGS. 27a through 27d describe the manner in which the multiplying problem is broken up and handled by the multiplier shown in FIG. 27.

In FIG. 27a the basic multiplication problem is set out. In a four-by-four bit multiplier it is desired to multiply the four-bit multiplicand A by the four-bit multiplier B and obtain the eight-bit product P. The first partial product $Q_1$ is formed by multiplying the rightmost digit of the multiplier by the multiplicand A. This produces the partial product $a_4b_1$, $a_3b_1$, $a_2b_1$, $a_1b_1$. The second partial product $Q_2$ is formed by multiplying the next rightmost digit of the multiplier B by the multiplicand A. This produces the partial product $Q_2$ which is $a_4b_2$, $a_3b_2$, $a_2b_2$, $a_1b_2$, 0. The 0 in the partial product $Q_2$ is necessary to account for $b_2$ being a higher order digit than $b_1$. With a 0 in the rightmost position of the partial product $Q_2$ it can be placed beneath the partial product $Q_1$ in proper alignment for subsequent addition. The partial product $Q_3$ is formed in similar manner by multiplying the third rightmost digit $b_3$ of the multiplier B by the multiplicand A. The last two digit positions in the partial product at $Q_3$ are zeros to account for the digit position of $b_3$ in the multiplier at $b$. In like manner the partial product $Q_4$ is formed with the last three digit positions being 0. If the partial products $Q_1$ through $Q_4$ are added together they form the product P which consists of the digits $p_1$, $p_2$, $p_3$, $p_4$, $p_5$, $p_6$, $p_7$ and $p_8$.

In accordance with the multiplier algorithm the partial products $Q_1$ through $Q_4$ are first divided into pairs. The partial products appearing in each pair are then added together. The sums of these additions are then paired to form the combination for the next addition. In the specific example of a four-bit multiplier the partial product $Q_1$ is paired with the partial product $Q_2$ and the partial product $Q_3$ is paired with $Q_4$. This particular grouping is selected for circuit economy in the actual multiplier construction. It should be noted however that the first level could just as well be made up of other possible pairs such as combining partial product $Q_1$ with partial product $Q_3$ in one pair and partial product $Q_2$ and partial product $Q_4$ in the other pair. Furthermore, the grouping of partial product $Q_1$ with partial product $Q_4$ to form one pair and partial product $Q_2$ with partial product $Q_3$ to form the other pair, could also be employed.

FIG. 27b shows in diagram form the manner in which a partial product $Q_1$ may be added to the partial product $Q_2$ to form a sum designated as $U_a$. Since the rightmost digit of the partial product $Q_2$ is always 0, the rightmost digit of the partial product $Q_1$ is the rightmost digit of the sum $U_a$, i.e., $u_{a1}$. In other words, the rightmost digit of the sum $U_a$ is formed without addition. The addition of the remaining three digits of the partial product $Q_1$ may be added to the middle three digits of the partial product $Q_2$ in a three bit by three bit adder. This adder may be of the type constructed in accordance with the rule as set out for the eight-bit adder in FIG. 22. The sum from the adder contains four digits $S_1$, $S_2$, $S_3$ and $S_4$. The first three digits $S_1$, $S_2$, $S_3$ form the next three digits of the sum $U_a$, i.e. the digits $u_{a2}$, $u_{a3}$, $u_{a4}$. The carry output $S_4$ from the adder may be added to the remaining bit of the partial product $Q_2$ in an add-one circuit of the type described in connection with FIGS. 4 and 5. The two outputs from this add-one circuit would form the last two digits of the sum $U_a$, i.e., the digits $u_{a5}$, $u_{a6}$.

FIG. 27c shows in diagram form the manner in which the partial product $Q_3$ is added to the partial product $Q_4$ to form the sum $U_b$. The two rightmost digits of the partial product $Q_3$ and the partial product $Q_4$ are always 0. Accordingly, since these digit positions never carry any information they may be disregarded at this point and accounted for later by shifting the sum $U_b$ two digit positions to the left. The first significant bit of the partial product $Q_3$ is $a_1b_3$. The corresponding digit in the partial product $Q_4$ is always 0. It is therefore possible to permit the digit $a_1b_3$ to pass through without addition and form the first or rightmost digit of the sum $U_b$, i.e., $u_{b1}$. The remaining three digits of the partial product $Q_3$ may be added to the three rightmost significant bits of the partial product $Q_4$ in a three-by-three bit adder. The output of this adder produces the next three significant bits of the sum $U_b$, i.e., $u_{b2}$, $u_{b3}$, $u_{b4}$, and a carry $S_4$. The carry is combined with the remaining bit of the partial product $Q_4$ to obtain the last two bits of the sum $U_b$, i.e., $u_{b5}$ and $u_{b6}$.

FIG. 27d shows the final step in the multiplication process. This step concerns the addition of the sum $U_a$ with a sum $U_b$ to form the product P. In this addition the sum $U_b$ must be shifted two digit positions to the left to account for the two digit positions disregarded in forming the addition described in FIG. 27c. As is apparent in FIG. 27d the two rightmost digits in the sum $U_a$, i.e., $u_{a1}$ and $u_{a2}$, form the two rightmost digits of the product P, i.e., digits $p_1$ and $p_2$. Accordingly, these two digits may pass through without addition. The remaining four bits of the sum $U_a$ and the four rightmost bits of the sum $U_b$ may be combined in a four bit-by-four bit adder. This adder may be of the type constructed in accordance with the rules laid down for the eight bit adder described in FIG. 22. The output from the four bit-by-four bit adder is a five bit number $S_1$, $S_2$, $S_3$, $S_4$, $S_5$. The bits $S_1$ through $S_4$ form the next three bits of the product P, i.e., the bits $p_3$, $p_4$, $p_5$ and $p_6$. The carry output $S_5$ of the adder may be added to the remaining two digits of the sum $U_b$, i.e., $u_{b5}$ and $u_{b6}$ in an add-one circuit of the type described in FIGS. 6 and 7. The output from this add-one circuit forms the remaining two digits of the product P, i.e., the digits $p_7$ and $p_8$.

It may seem that it should be necessary to provide for a ninth digit in the product P. This would seem necessary in the event that both the digits $u_{b5}$ and $u_{b6}$ and the carry $S_5$ from the adder are all one. In such a situation the output from the add-one circuit would be a three digit number 100 thus requiring a third output from the add-one circuit which would be the digit $p_9$. It is pointed out, however, that the inputs to the add-one circuit may never all be one at the same time since the product of the numbers being multiplied can never be that large. The largest multiplicand A that a four-bit multiplier can handle occurs when $a_1$, $a_2$, $a_3$, $a_4$ are all equal to 1. This would be a multiplicand equal to 1111 in binary form or the number 15 in decimal form. Similarly, the largest multiplier B that could be handled would be 1111 in binary form or 15 in decimal form. It follows, then, that the largest product P which may appear is the decimal number 225 or in binary numbers the eight digit number 11100001. Since this eight bit binary number is the largest output which can ever be produced by the four bit multiplier, it is not necessary to make any provisions for a ninth digit in the product P.

In the four-bit multiplier shown in FIG. 27 the multiplicand A, consisting of the digits $a_1$, $a_2$, $a_3$ and $a_4$, is connected to terminals 491 through 494. The multiplier B, consisting of the digits $b_1$, $b_2$, $b_3$ and $b_4$, is connected to the terminals 496 through 499. The lines connecting to the terminals 491 through 494 and 496 through 499, as well as all other conductor lines on the diagram, each represent pairs of lines. Current flow through one conductor of these pairs represents the one condition while current flows through the other conductor of these pairs represents a zero condition.

The partial product $Q_1$ is obtained in the multiplier block 433 where the multiplicand $a_1$, $a_2$, $a_3$ and $a_4$ is multiplied by the multiplier $b_1$. The partial product $Q_2$ is obtained from the multiplier block 435 where the multiplicand $a_1$, $a_2$, $a_3$ and $a_4$ is multiplied by $b_2$. The partial product $Q_3$ is obtained in the multiplier block 437 where the multiplicand $a_1$, $a_2$, $a_3$ and $a_4$ is multiplied by $b_3$. The partial product $Q_4$ is obtained from the multiplier block 439 where the multiplicand $a_1$, $a_2$, $a_3$, $a_4$ is multiplied by $b_4$. The adder block 441 adds the partial product $Q_1$ to the partial product $Q_2$ and obtains the sum $U_a$. The adder block 443 adds the partial product $Q_3$ to the partial product $Q_4$ to obtain the sum $U_b$. The adder block 445 adds the sum $U_a$ to the sum $U_b$ to obtain the product consisting of the digits $p_1$, $p_2$, $p_3$, $p_4$, $p_5$, $p_6$, $p_7$ and $p_8$.

The multiplier block 433 includes four $T_0$ multiplier circuits 447 through 450. These circuits function essentially as two input AND circuits and may be of the type previously described in connection with FIGS. 25 and 26. The digit $b_1$ is connected as the $d$ input to each of the four $T_0$ multiplier circuits 447 through 450. The multiplicand A is applied to the $f$ inputs of these circuits with $a_1$ connected to the $f$ input of $T_0$ multiplier circuit 447, $a_2$ connected to the $f$ input to $T_0$ multiplier circuit 448, $a_3$ connected to the $f$ input of the $T_0$ multiplier circuit 449, and $a_4$ connected to the $f$ input of $T_0$ circuit 450.

In a multiplication operation whenever $b_1$ is equal to zero the partial product $Q_1$ is also equal to zero. Since the $T_0$ multiplier circuits 447 through 450 act as two input AND circuits and $b_1$ forms the $b$ input to each of these circuits, the outputs $M_1$ of each of these circuits must be zero. Accordingly, the zero level is present on each of the lines 451 through 454 which make up the four digits of the partial product $Q_1$. It is seen therefore that whenever $b_1$ is zero the partial product appearing on the lines 451 through 454 is zero.

Whenever the digit $b_1$ of the multiplier is equal to one then the partial product $Q_1$ should be equal to the multiplicand $a_4$, $a_3$, $a_2$, $a_1$. In the multiplier block 433 when the multiplier $b_1$ is equal to one then the $d$ input to each of the $T_0$ multiplier circuits 447 through 450 is equal to one. Whenever the $d$ input to a $T_0$ multiplier block is equal to one then the $M_1$ output is the same as the $f$ input, i.e., when $f$ is equal to 1 then $M_1$ is equal to 1 and when $f$ is equal to zero then $M_1$ is equal to zero. In effect, the signal on the $f$ input is permitted to pass through whenever the $d$ input is equal to one. In effect then, whenever $b_1$ is equal to one, the digits $a_4$, $a_3$, $a_2$, $a_1$ pass through their respective $T_0$ multiplier circuits 447 through 450 and appear on the lines 451 through 454. Accordingly, whenever the digit $b_1$ of the multiplier is equal to one then the partial product $Q_1$ appearing on the lines 451 through 454 is equal to the multiplicand $a_4$, $a_3$, $a_2$, $a_1$.

The multiplier block 435 contains the $T_0$ multiplier circuits 455 through 458. The multiplier block 437 contains the $T_0$ multiplier circuits 463 through 466. The 439 multiplier block contains the $T_0$ multiplier circuits 471 through 474. The multiplier blocks 435, 437 and 439 operate the same as the multiplier block 433 except that in multiplier block 435, the multiplier digit is $b_2$, in multiplier block 437 the multiplier digit is $b_3$ and in multiplier block 439 the multiplier digit is $b_4$. The multiplier block 435 produces the partial product at $Q_2$ which appears on the lines 459 through 462. The multiplier block 437 produces the partial product $Q_3$ which appears on the lines 467 through 470. The multiplier block 439 produces the partial product $Q_4$ which appears on lines 475 through 478.

The adder block 441 performs the addition previously described in FIG. 27b which is the addition of the partial product $Q_1$ to the partial product $Q_2$ to form the sum $U_a$. This adder block 441 includes a three bit-by-three bit adder 479 and an $R_1$ add-one circuit 481. The three bit-by-three bit adder 479 may be constructed in a manner described for the construction of the eight bit-by-eight bit adder of FIG. 22. The add-one circuit 481 may be of the type described in FIGS. 4 and 5.

In performing the addition in the adder circuit 441, the rightmost digit of the partial product $Q_1$ appearing on line 451 is permitted to pass through and form the rightmost digit of the sum $U_a$. The remaining three digits of the partial product $Q_1$ appearing on lines 452 through 454 enter the three bit-by-three bit adder 479 as the $a$ inputs. The three rightmost digits of the partial product $Q_2$ appearing on the lines 459 through 461 enter the three bit-by-three adder 479 as the $b$ inputs. The three rightmost outputs of the three bit-by-three bit adder 479 apearing on lines 480, 482 and 484 form the second, third and fourth bits, respectively, of the sum $U_a$. The remaining digit of the partial product $Q_2$ appearing on line 462 is added to the carry $S_4$ appearing on line 486 (coming from the three bit-by-three bit adder 479) in the add-one circuit 481. The outputs from the add-one circuit 481 appearing on lines 488 and 490 form the last two digits, respectively, of the sum $U_a$.

The multiplier block 433 contains a three bit-by-three bit adder 483 and an $R_1$ add-one circuit 485 both of which are essentially the same as those in adder block 441. The partial product $Q_3$ is added to the partial product $Q_4$ to form the sum $U_b$ in essentially the same manner as the partial product $Q_1$ is added to the partial product $Q_2$ in the adder block 441.

The adder block 445 contains a four bit-by-four bit adder 487 and an $R_2$ add-one circuit 489. The four bit-by-four bit adder 487 may be of the type described in connection with FIG. 22. The $R_2$ add-one circuit 489 may be of the type described in FIGS. 6 and 7. The adder block 445 carries out the addition as described in FIG. 27d. The two rightmost digits of the sum $U_a$ appearing on lines 451 and 480 are permitted to pass through the adder block and form the rightmost digits of the product $p_1$ at terminal 501 and $p_2$ at terminal 502, respectively. The remaining four digits of the sum $U_a$ appearing on lines 482, 484, 488 and 490 form the $a$ inputs to the four bit-by-four bit adder 487. The four rightmost outputs of the four bit-by-four bit adder 487 appearing on the lines 515 through 518 from four digits of the product $p_3$, $p_4$, $p_5$, $p_6$, respectively, at terminals 503 through 506. The carry output $S_5$ of the four bit-by-four bit adder 487 appearing on line 519 forms the $b$ input to the $R_2$ add-one circuit 489. The remaining two digits of the sum $U_b$ apearing on lines 513 and 514 form the $a$ inputs of the $R_2$ add-one circuit 489. The output from the add-one circuit 489 forms the last two digits $p_7$, $p_8$ of the product appearing at terminals 507 and 508.

FIG. 28 shows a single adder which may replace the adder block 441 in FIG. 27. The adder block 441 in FIG. 27 preforms the operation of adding two four bit numbers where one of the four bit numbers is known to always have a zero as its least significant bit. In this situation the simpler adder shown in FIG. 28 may be employed.

FIG. 29 describes an adder which may replace the adder block 445 in FIG. 27. Both the adder in FIG. 29 and the adder block 445 in FIG. 27 perform the operation of adding a six digit number to a six digit number where it is known that the least significant two digits of one of the numbers are always zero.

The adders described in FIG. 28 and FIG. 29 are of the type used when it is desired to add two numbers A and B, where A has $n+k$ bits the $k$ least significant of which are always zero and where B has $n$ bits ($n$ being greater than $k$). An adder for adding the numbers A and B with a minimum of levels containing add-one circuits may be constructed in accordance with the following algorithm:

*Algorithm 3*

(1) the inbuts $b_k$, ..., $b_1$ are not fed into any add-one circuits, but are fed through the adder to form the outputs $S_k$, ..., $S_1$, respectively.

(2) The first level of the adder consists of $n-k-1$ add-one circuits of the $R_1$ type and one add-one circuit (including a $c_{n+1}$ output) of the $R_{k+1}$ type. The inputs are applied to the add-one circuits in pairs as follows: $a_{n-1}$, $b_{n-1}$), ..., ($a_{k+1}$, $b_{k+1}$). The $b$ digits are connected to the $b$ input of the add-one circuits and the $a$ digits are connected to the $a$ inputs to the add-one circuits. The digits $a_{n+k}$, ..., and $b_n$ are connected to the add-one circuit of the $R_{k+1}$ type, with $b_n$ being connected to the $b$ input and $a_{n+k}$, ..., $a_n$ being connected to the $a$ inputs.

(3) A subsequent level $j$ is constructed in the following manner (for identification purposes designate the rightmost add-one circuits in any level as the first add-one circuit, the next rightmost add-one circuit as the second add-one circuit, etc.):

(a) Take the carry or leftmost output of the first add-one circuit in the $j-1$ level and connect it to the $b$ input of the first add-one circuit in the $j$ level. Take all outputs of the second add-one circuit in the $j-1$ level plus any as yet unconnected outputs from add-one circuits which feed the second add-one circuit in the $j-1$ level, and connect these outputs as the $a$ inputs to the first add-one circuit in the $j$ level in their order of appearance from left to right.

(b) Use the carry output (leftmost) of the next to the last add-one circuit appearing in the $j-1$ level, as the $b$ input to the last add-one circuit appearing in the $j$ level. Take all of the outputs of the last add-one circuit in the $j-1$ level, and any as yet unconnected outputs from add-one circuits which feed the last add-one circuit in the $j-1$ level, and utilize these outputs as the $a$ inputs to the last add-one circuit on the $j$ level in their order of appearance from right to left.

(c) If there are more than two add-one circuits remaining in the $j-1$ level which have not been connected to an add-one circuit in the $j$ level, select either the rightmost or the next to the leftmost one in the $j-1$ level and repeat the process of subparagraph (a) considering this add-one circuit in the $j-1$ level as the first add-one circuit of that level. If there are still more than two unconnected add-one circuits in the $j-1$ level, repeat the process again until such time as less than two unconnected add-one circuits appear in the $j-1$ level.

(d) If after completing the process of sub-paragraph (c), a single unconnected add-one circuit remains in the $j-1$ level, disregard this add-one circuit while forming the $j$ level and consider it as being on the $j$ level when forming the $j+1$ level.

(4) Continue to form levels according to the process of paragraph 2 until a level is reached which contains only one add-one circuit and is such that there are no unconnected outputs from the preceding level to the left of this add-one circuit. The final output of the adder is the outputs $S_1$, $S_2$, $S_3$, $S_4$, ..., $S_{n+k}$, $S_{n+k+1}$ by taking the outputs of paragraph 1, the outputs of any as yet unconnected outputs from add-one circuits, and the outputs from the add-one circuit of the last level.

(5) In many instances, and particularly in combination with multipliers, the largest possible number which the adder can handle never occurs. In such situations the adder may be simplified somewhat by omitting the carry output of the add-one circuit of the $R_{k+1}$ type in the first level. By making this omission, the adder has one less output, i.e., the most significant bit is omitted.

It should be noted that the algorithm 1 is merely a specific example of the algorithm 3 where $k$ is equal to 0.

An adder shown in FIG. 28 is constructed in accordance with algorithm 3. The particular circuit here shown has $n$ equal to 4 and $k$ equal to 1. This means that the circuit performs an addition between a number $A=a_5$, $a_4$, $a_3$, $a_2$, 0 and a number $B=b_4$, $b_3$, $b_2$, $b_1$. The digits of the numbers A and B are applied to the terminals 532 through 539 as indicated on the drawings. The first level of the adder consists of the add-one circuits 541 and 543 of the $R_1$ type and one add-one circuit 545 of the $R_2$ type. The second level of the adder consists of a single add-one circuit 547 and of the $R_2$ type. The third level of the adder also consists of a single add-one circuit 549 of the $R_2$ type. The digit $b_1$ is connected to the terminal 532 and passes directly through by means of the line 530 to the output terminal 551 to form the first digit $S_1$ in the sum. Digit $b_2$ enters the adder at terminal 533 and is connected as the $b$ input to the add-one circuit 541. Digit $a_2$ enters the adder by means of terminal 534 and forms the $a$ input to the add-one circuit 541. Digit $b_3$ and digit $a_3$ enter through terminals 535 and 536, respectively, and are connected as the $b$ and $a$ inputs, respectively, of the add-one circuit 543. The digit $b_4$ enters the adder by means of the terminal 537 and is connected as the $b$ input to the add-one circuit 545. The remaining digits $a_4$ and $a_5$ enter by means of the terminals 538 and 539 and form the $a_1$ and $a_2$ inputs of the add-one circuit 545. The $c_1$ output of the add-one circuit 541 is connected to the output terminal 552 and forms the second digit of the sum $S_2$. The carry output $c_2$ of the rightmost add-one circuit 541 level 1 is connected as the $b$ input to the first add-one circuit 547 in the second level. The outputs of the second add-one circuit 543 in the first level form the inputs $a_1$ and $a_2$ of the add-one circuit 547 of the second level. The $c_1$ output of the add-one circuit 547 is connected to the output terminals 553 and forms the third digit $S_3$ of the sum. The leftmost or carry output $c_2$ of the add-one circuit 547 is connected to the $b$ input of the add-one circuit 549. The add-one circuit 545 was disregarded when forming the second level since there were an odd number of add-one circuits in the first level. Accordingly, the add-one circuit 545 is considered as being on the second level when forming the third level. In accordance with algorithm 3 the outputs $c_1$ and $c_2$ of the add-one circuit 545 form the $a_1$ and $a_2$ inputs to the add-one circuit 549. The outputs $c_1$ and $c_2$ of the add-one circuit 549 are connected to the output terminals 554 and 555 to form the last two digits $S_4$ and $S_5$ of the sum.

FIG. 29 shows an adder constructed according to algorithm 3 wherein $n$ is equal to 6 and $k$ is equal to 2. The numbers being added are $A = a_8, a_7, a_6, a_5, a_4, a_3, 0, 0$ and $B = b_6, b_5, b_4, b_3, b_2, b_1$. The first level of the adder consists of three add-one circuits 565, 567 and 569 of the $R_1$ type and one add-one circuit 563 of the $R_3$ type. The second level consists of one add-one circuit 573 of the $R_2$ type and one add-one circuit 571 of the $R_3$ type. The third level of the adder consists of an add-one circuit 575 of the $R_4$ type.

Since the digit $a_1$ is zero the sum of $a_1$ and $b_1$ would be $b_1$. Accordingly, the digit $b_1$ is permitted to bypass the adder via line 560 to form the first digit $S_1$ of the sum. Similarly, since $a_2$ is equal to zero the $b_2$ digit is permitted to bypass the adder via line 561 to form the second bit $S_2$ of the sum. The remaining $b$ inputs, i.e., $b_3$, $b_4$, $b_5$, and $b_6$, are connected at the $b$ inputs to add-one circuits 569, 567, 565 and 563. The digits $a_3$, $a_4$ and $a_5$ are connected at the $a$ inputs to the add-one circuits 569, 567 and 565. The $a_6$, $a_7$, $a_8$ digits are connected at the $a_1$, $a_2$, $a_3$ inputs, respectively, of the add-one circuit 563. The $c_1$ output of the add-one circuit 569 forms the fifth digit $S_3$ of the sum. The carry output $c_2$ of the first add-one circuit 569 of the first level is connected at the $b$ input to the first add-one circuit 573 of the second level. The outputs $c_1$ and $c_2$ of the second add-one circuit 567 of the first level are connected to the $a_1$ and $a_2$ inputs to the add-one circuit 573. The carry output $c_2$ of the next-to-the-last add-one circuit 565 of the first level is connected at the $b$ input to the last add-one circuit 571 of the second level. The outputs $c_3$, $c_2$, $c_1$ of the last add-one circuit 563 of the first level are connected as inputs $a_3$, $a_2$ and $a_1$ in the last add-one circuit 571 of the second level. The $c_1$ output of the add-one circuit 573 forms the fourth digit $S_4$ of the sum. The carry or $c_2$ output of the first add-one circuit 573 of the second level forms the $b$ input for the first add-one circuit 575 of the third level. The outputs $c_3$, $c_2$ and $c_1$ of the second add-one circuit 571 of the second level plus the output $c_1$ from the add-one circuit 565 which feeds the add-one circuit 571 are connected as inputs $a_4$, $a_3$, $a_2$ and $a_1$ of the add-one circuit 575. The outputs $c_1$, $c_2$, $c_3$ and $c_4$ form the remaining digits $S_5$, $S_6$, $S_7$ and $S_8$ of the sum.

It is possible by following the foregoing algorithm to produce an adder which adds together the numbers A and B where these two numbers contain a different number of digits. For example, note that if the line 530 (FIG. 8) is omitted the adder becomes one which adds a three bit B number to a four bit A number. Similarly, in FIG. 29 an adder which adds a six bit A number to a four bit B number is formed by omitting the lines 560 and 561.

FIGS. 30a through 30g show an improved multiplier construction. The particular multiplier shown is for multiplying an eight bit number by an eight bit number. In the multiplication of two eight bit number eight partial products $Q_1$, $Q_2$, $Q_3$, $Q_4$, $Q_5$, $Q_6$, $Q_7$ and $Q_8$ are described in connection with FIG. 23. FIG. 30h shows the manner in which the eight partial products are combined in the multiplier as illustrated in FIG. 30a through 30g. Following algorithm 2, the first step in combining partial products is to arrange the partial products in sets of disjoint pairs and then add together the partial product in each pair to form the sum $U_a$, $U_b$, $U_c$ and $U_d$. In this instance the pairs formed in the first group of partial product $Q_1$ with the partial product $Q_5$, partial product $Q_2$ with partial product $Q_6$, partial product $Q_3$ with partial product $Q_7$, and partial product $Q_4$ with partial product $Q_8$. In the addition of the partial products according to the pairs in the first group, the addition of partial product $Q_1$ to partial product $Q_5$ produces the first sum $U_a$. The addition of the partial product $Q_2$ and partial product $Q_6$ produces the sum $U_b$. The addition of the pair $Q_3$ and partial product $Q_7$ produces the sum $U_c$. The addition of the pair partial product $Q_4$ and partial product $Q_8$ produces the sum $U_d$. The sums which appear in the second group may then be paired in a manner similar to that in which the partial products are paired in the first group. Accordingly, the sum $U_a$ is paired with the sum $U_c$ and the sum $U_b$ is paired with the sum $U_d$. The addition of the first pair, i.e., sum $U_a$ and sum $U_b$, produces the sum $V_a$. The addition of the sums in the second pair, i.e., sum $U_b$ and sum $U_d$ produces the sum $V_b$. Finally, the sums in the third group, i.e., sums $V_a$ and $V_b$, are added together to form the product P.

With the partial products forming sets of pairs in the first group as shown in FIG. 30h, the construction of a multiplier may be simplified considerably by combining the multiplier function which forms the partial products together with the first stage of addition. Take, for example, the forming of the sum $U_a$. This sum is formed by the addition of the partial product $Q_1$ and partial product $Q_5$ of the first group. The partial product $Q_5$ always contains zeros in the four least significant bit positions. Accordingly, the four least significant bits of the partial product $Q_1$ form the four least significant bits of the sum $U_a$. Beginning with the least significant bit, the first four bits of the sum $U_a$ are the products $a_1b_1$, $a_2b_1$, $a_3b_1$, $a_4b_1$. These four digits may be referred to as the non-overlap digits.

It is next desired to add the fifth digit of the partial product $Q_1$ which is $a_5b_1$, to the fifth digit of the partial product $Q_5$, which is $a_1b_5$. The forming of these two digits and their addition may be performed by an add-one circuit of an improved type. If $b_1$ is equal to one and $b_5$ is equal to one, the sum of these two digits is merely $a_5 + a_1$.

The addition of two single bit numbers may be performed by an add-one circuit of the $R_1$ type. A circuit of this type may be modified slightly so that it is able to perform the addition of the digits $a_5b_1$ and $a_1b_5$ for all possible values of $b_1$ and $b_5$. This modification may be accomplished by making the digit $a_5$ appear to be zero regardless of its value whenever $b_1$ is zero. Also, provisions are necessary which would make the digit $a_1$ appear to be zero regardless of its value whenever the digit $b_5$ is equal to zero. Accordingly, it is seen that the improved type add-one circuit acts as an add-one circuit whenever $b_1$ is equal to one and $b_5$ is equal to one. The circuit also permits the sum to be the value of $a_5$ whenever $b_5$ is zero and permits it to be $a_1$ whenever $b_1$ is zero. Furthermore, the circuit causes the output to be zero whenever both $b_1$ and $b_5$ are zero. A circuit of this type is designated as a $T_1$ circuit. The sixth digit of the partial products $Q_1$ and $Q_5$ may be formed similarly and added by a $T_1$ circuit, i.e., the product $a_6b_1$ may be added to the product $a_2b_5$. In like manner, the seventh digits of the partial products $Q_1$ and $Q_5$, i.e., $a_7b_1$ and $a_3b_5$, may be formed and added in a $T_1$ circuit.

The eighth digit $a_8b_1$ of the partial product $Q_1$ may be added to the remaining five digits $a_4b_5$, $a_5b_5$, $a_6b_5$, $a_7b_5$ and $a_8b_5$ in a similarly modified add-one circuit of the $R_5$ type. This add-one circuit adds the digit $a_8$ to the multidigit number $a_8$, $a_7$, $a_6$, $a_5$, $a_4$ whenever both $b_1$ and $b_5$ are equal to one. Whenever $b_1$ is equal to zero the single digit number $a_8$ is made to appear as if it were zero regardless of its value. Similarly, whenever $b_5$ is equal to zero the multidigit number $a_8$, $a_7$, $a_6$, $a_5$, $a_4$ is made to appear as if it were zero regardless of its value. Accordingly, the add-one circuit of this type forms and properly adds the digit $a_8b_1$ of the partial product $Q_1$ to the digits $a_8b_5$, $a_7b_5$, $a_6b_5$, $a_5b_5$, $a_4b_5$ of the partial product $Q_2$. An $R_5$ add-one circuit of this type is designated as a $T_5$ circuit.

The add-one circuit of the $T_1$ type is designated as a $T_1$ multiplier circuit for convenience in nomenclature. A $T_1$ multiplier circuit 577 is illustrated in block form in FIG. 31. The multiplier circuit 577 performs the function of adding the product $ef$ to the product $dg$. In comparing this circuit with the add-one circuit as illustrated in FIG. 4, the $e$ input to the multiplier circuit 577 in FIG. 31 is similar to the $b$ input to the add-one circuit 24 in FIG. 4. The $b$ input to the multiplier circuit 577 in FIG. 31 is similar to the $a_1$ input to the add-one circuit 24 in FIG. 4. The input $f$ to the multiplier circuit 577 is the multiplier for the input $e$. The input $g$ to the multiplier circuit 577 is the multiplier for the input $d$. The sum of the two products appears on the output lines $M_1$ and $M_2$. The output line $M_2$ is sometimes referred to as the carry output.

The circuit construction of the $T_1$ multiplier circuit 577 is illustrated in detail in FIG. 32. The $d$ input is supplied on lines 595 and 597. When $d$ is one the current is applied at terminal 579 and when $d$ is zero a current is supplied to the line 597. The $e$ input is supplied to the lines 599 and 601. When $e$ is one, current is supplied to the line 599, and when $e$ is zero, current is applied to the line 601.

The $f$ input is applied to lines 603 and 605. When $f$ is one current is applied to the line 603, and when $f$ is zero current is applied to the line 605. The $g$ input is applied to lines 607 and 609. When $g$ is one current is applied to line 607 and when $g$ is zero current is applied to the line 609.

When current is applied at the terminal 711 it may flow along one of the lines 683, 685, 687 or 689 to the terminal 713, or it may flow along one of lines 691, 693, 695, 697 or 699 and exit at the terminal 717. Current flow at the terminal 715 indicates that the value of $M_1$ is one. Current flow at the terminal 717 indicates that the value of $M_1$ is zero. Current which enters at terminal 713 may flow along the line 701 and exit at terminal 719 or it may flow along one of these lines 703, 705, 707 or 709 and exit at the terminal 721. Current flow at the terminal 719 indicates the value of $M_2$ is one. Current flow at the terminal 721 indicates the value of $M_2$ is zero. Current flow in the line 595 operates the inhibitor 611, 613, 615 and 617 and exits at terminal 675. Current flow in the line 597 operates inhibitors 619, 621, 623 and 625 and exits at terminal 675. Current flow in the line 599 operates inhibitors 627, 629, 631 and 633 and exits at terminal 677. Current flow in the line 601 operates inhibitors 635, 637, 639 and 641 and exits at terminal 677. Current flow in the line 603 operates inhibitors 643, 645, 647 and 649 and exits at terminal 679. Current flow in the line 605 operates inhibitor 651, 653, 655 and 657 and exits at terminal 679. Current flow in the line 607 operates inhibitors 659, 661, 663 and 665 and exits at terminal 681. Current flow in the line 609 operates inhibitor 667, 669, 671 and 673 and exits at terminal 681.

In operation the multiplier circuit 577 in FIG. 31 responds to combinations of signals applied to the terminals $d$, $e$, $f$ and $g$ and generates combinations of signals on the outputs $M_1$ and $M_2$ which represent the sum of the products $ef$ and $dg$. The mathematical expressions on the right-hand portions of the horizontal lines in FIG. 31 indicate what inputs are necessary to make the associated horizontal line superconductive. For example, the expressions $\overline{d}ef$ indicates that the line 683 is superconductive and may carry current when $d$ is zero, $e$ is one and $f$ is one. When $d$ is zero, there is no current which enters at terminal 579 and flows down the line 595, but current does enter at terminal 581 and flows along the line 597 making the gate elements of inhibitor 619, 621 and 623 resistive. When $e$ is one, no current enters at terminal 585 and flows along line 601, but current enters at terminal 593 and flows along line 599 making the gate elements of inhibitors 627, 629 and 631 resistive. When $f$ is one, no current enters at terminal 589 and flows along line 605, but current enters at terminal 587, flows along line 603 and makes the gate elements of inhibitors 643, 645 and 647 resistive. Since the methematical expression $\overline{d}ef$ does not indicate the value of $g$, $g$ may take on either value. Accordingly, if $g$ is one, current enters at 591 and flows along line 607 making the gate element of inhibitors 659, 661 and 663 resistive. Alternately, if $g$ is equal to zero then current enters at terminal 593 and flows along line 609 making the gate elements of inhibitors 667, 669 and 671 resistive. Since the inhibitors 611, 635 and 651 have not operated, current which enters at terminal 711 flows along the line 683 and exits at terminal 715. Since there is a resistive gate element in each of the lines 685, 687, 689, 691, 693, 695, 697 and 699 current flow is diverted from these lines. Accordingly, there is no current flow at the terminal 717. In like manner, the expression $d\overline{e}g$ indicates the necessary input conditions for the line 685 to become conductive. Also, the expression $ef\overline{g}$ indicates the input conditions necessary for the line 687 to become superconductive and the expression $d\overline{f}g$ indicates the input conditions necessary for the line 689 to become superconductive. Similarly, the remaining expression indicates when their respective lines become superconductive thus indicating when current flows through the terminals 715, 717, 719 and 721.

FIG. 33 illustrates a $T_5$ multiplier circuit 724 in block form. This multiplier circuit produces the sum of the product of $e$ and $f$ and the product of the multidigit number $d_5$, $d_4$, $d_3$, $d_2$, $d_1$ and $g$. The $e$ input to the multiplier circuit 724 in FIG. 33 is similar to the $b$ input to the add-one circuit 280 of FIG. 12. The inputs $d_5$, $d_4$, $d_3$, $d_2$ and $d_1$ of the multiplier circuit 724 in FIG. 33 are similar, respectively, to the inputs $a_5$, $a_4$, $a_3$, $a_2$, $a_1$ to the add-one circuit 280 in FIG. 12. The $f$ input is the multiplier for the $e$ input. The $g$ input is the multiplier for the $d_5$, $d_4$, $d_3$, $d_2$ and $d_1$ inputs.

The construction of the $T_5$ multiplier circuit 724 is shown in FIGS. 34a and 34b. The mathematical expressions on the right side of the horizontal lines indicate the combination of inputs applied at terminals 736 through 751 to render the associated line superconductive. The units present within the block 727 are employed to obtain the $M_1$ output. Current enters at terminal 752 one of the superconductive paths and exits at either terminal 760 or 761. Current flow at terminal 760 indicates that $M_1$ is equal to 1. Current flow at terminal 761 indicates that $M_1$ is equal to zero. The units within the block 728 are employed to determine the $M_2$ output. Current entering at terminal 753 flows down one of the horizontal superconductive lines and exits either at terminal 762 or 763. Current flow at 762 indicates that the value of $M_2$ is equal to one. Current flow at terminal 763 indicates that the value of $M_2$ is equal to zero. The elements within the block 729 are employed to determine the $M_3$ output. Current entering at terminal 754 flows down one of the horizontal superconductive lines and exits at either 764 or 765. Current flow out of terminal 764 indicates that the value $M_3$ is equal to one. Current flow at the terminal 765 indicates that the value of $M_3$ is equal to zero.

The elements within the block 730 are employed in determining the $M_4$ output. Current flow which enters at terminal 755 may flow along any one of the horizontal lines and exit at either terminal 766 or 767. Current flow at terminal 766 indicates that the value of $M_4$ is equal to one. Current flow at terminal 767 indicates that the value of $M_4$ is equal to zero. The units within the block 731 are employed in determining the $M_5$ output. Current entering at terminal 756 may flow down any one of the horizontal lines and exit at either terminal 768 or terminal 769. Current flow at terminal 768 indicates that the value of $M_5$ is equal to one. Current flow at the terminal 769 indicates that the value of $M_5$ is equal to zero. The elements within block 732 are employed in determining the $M_6$ output. Current which enters at the terminal 757 may flow down any of the horizontal lines and exit at either terminal 770 or 771. Current flow at terminal 770 indicates that the value of $M_6$ is equal to one. Current flow at terminal 771 indicates that the value of $M_6$ is equal to zero.

Multiplier circuits other than of the $T_1$ and $T_5$ type may easily be constructed if required. Table 3 belows lists the general mathematical expressions which are to be followed in constructing a multiplier circuit $T_n$.

TABLE III $M_1 = ef\bar{d_1} \lor ef\bar{g} \lor d_1 g \bar{f} \lor d_1 g \bar{e}$ $\overline{M_1} = (d_1 efg) \lor (\overline{eg}) \lor (\overline{d_1 f}) \lor (\overline{fg}) \lor (\overline{d_1 e})$ $M_i = (d_i \bar{d}_{i-1} g) \lor (d_i \bar{d}_{i-2} g) \lor \ldots \lor (d_i \bar{d}_1 g) \lor (d_i \bar{e} g)$
$\qquad \lor (d_i \bar{d}_{i-1} d_{i-2} \ldots d_1 efg) \lor (d_1 g \bar{f})$ $\overline{M_i} = (\overline{fg}) \lor (d_i d_{i-1} d_{i-2} \ldots d_1 efg) \lor (\overline{d_i \bar{d}_{i-1}}) \lor (\overline{d_i \bar{d}_{i-2}})$
$\qquad \lor \ldots \lor (\overline{d_i d_1}) \lor (\overline{d_i \bar{e}}) \lor (\overline{d_i f}) \lor (\overline{fg})$ $M_{m+1} = (d_n d_{n-1} \ldots d_1 efg)$ $\overline{M_{m+1}} = (\overline{d_n}) \lor (\overline{d_{n-1}}) \lor (\overline{d_{n-2}}) \lor \ldots \lor (\overline{d_1}) \lor (\overline{e}) \lor (\overline{f}) \lor (\overline{g})$ The first M outputs $M_1, M_2 \ldots M_n$ are formed by following the expression for $M_i$ and $\overline{M}_i$. The next and last output $M_{n+1}$ is formed by following the expression for this output given in the last few lines of Table 3.

Figure 30A:
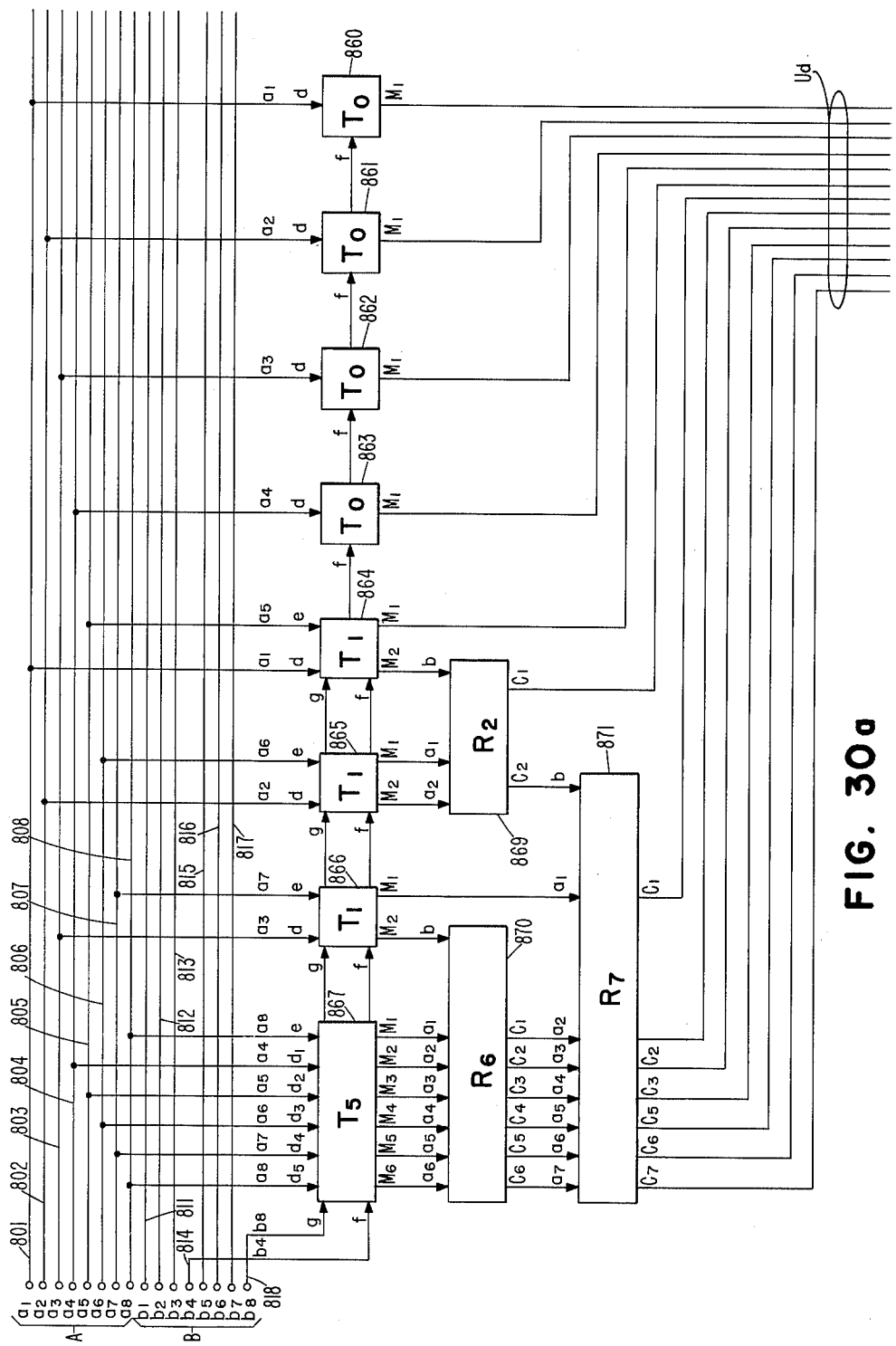
Figure 30C:
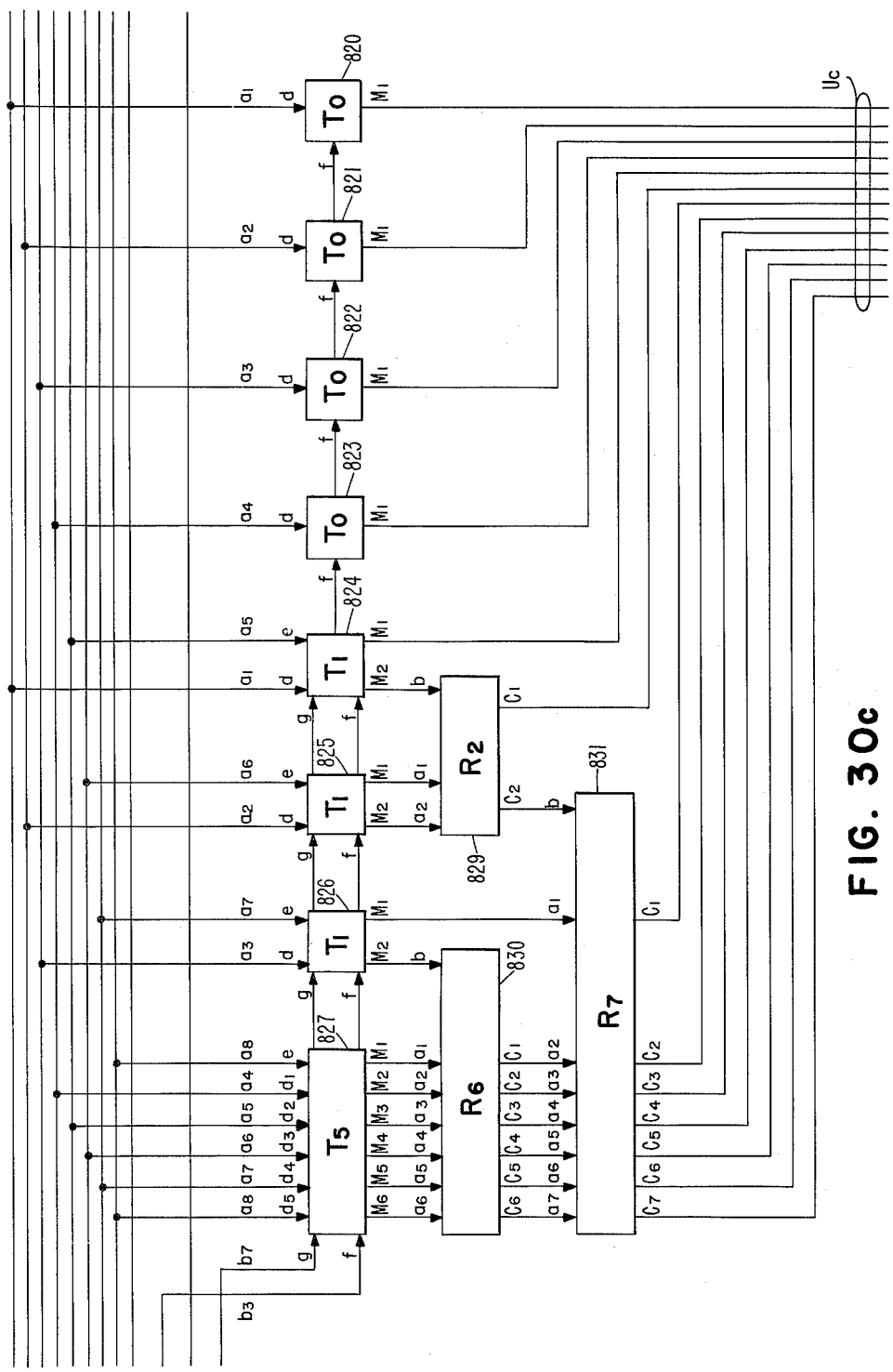
Figure 30E:
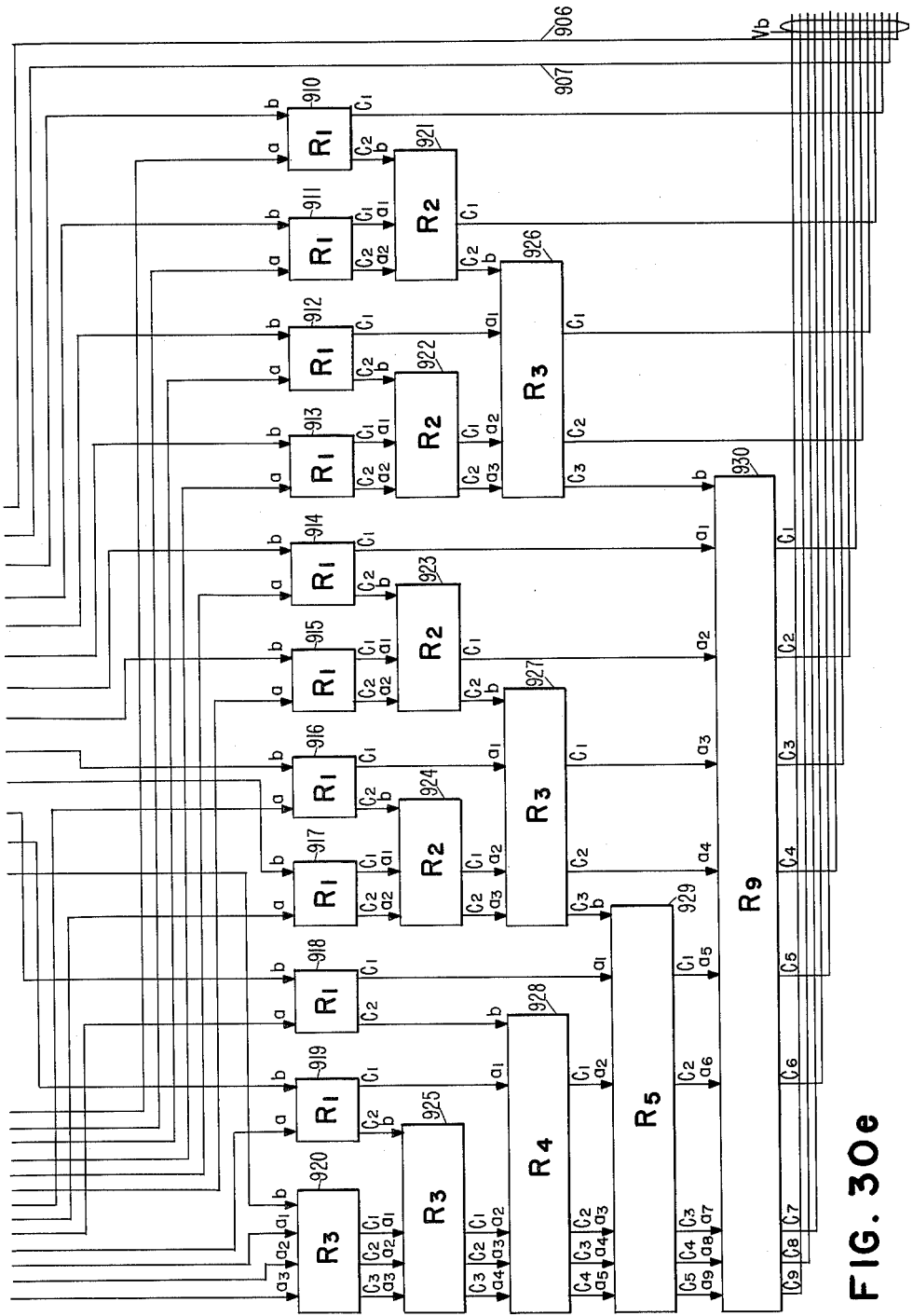
Figure 30G:
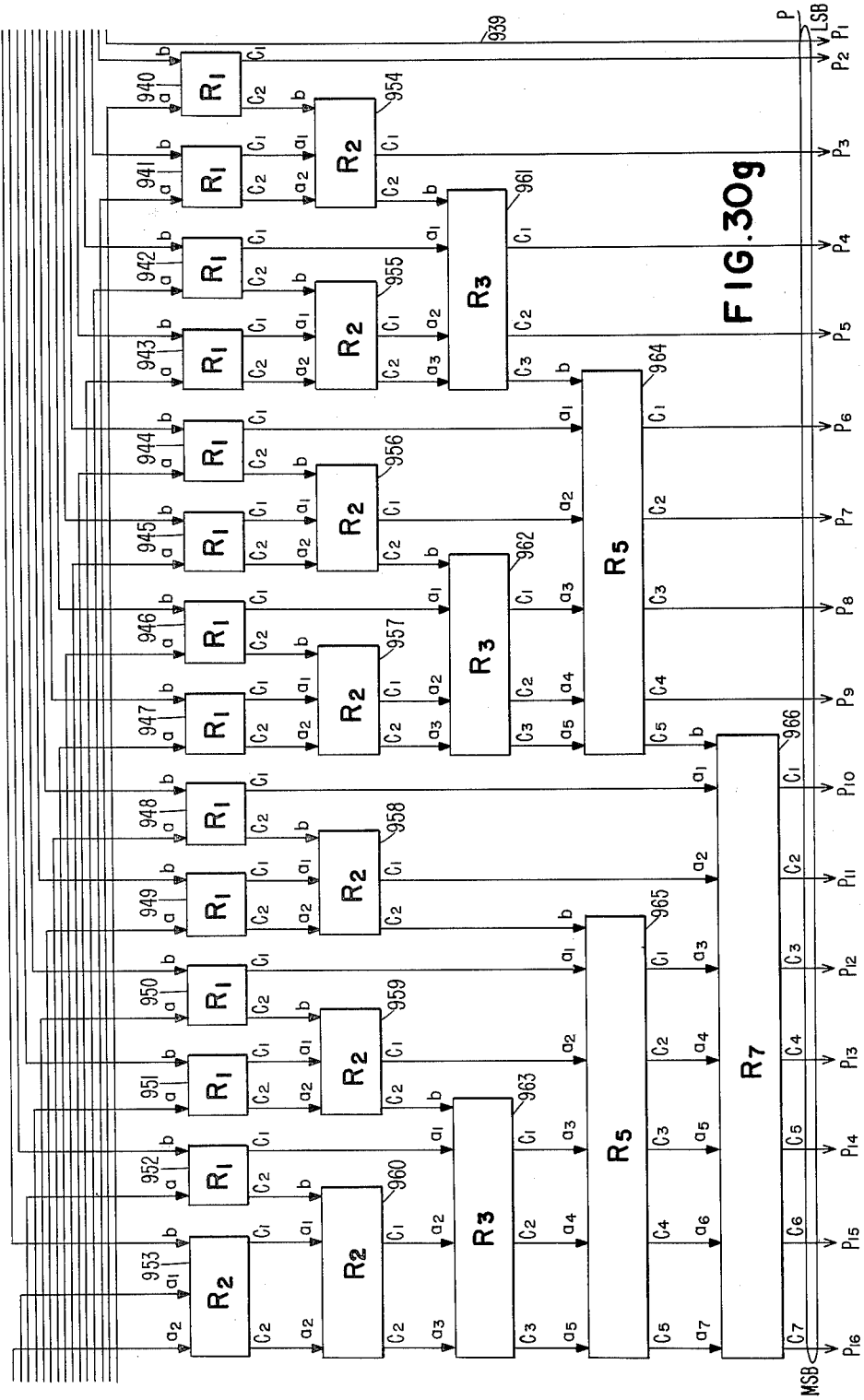

FIGS. 30a through 30g make up an illustration of a multiplier specifically designed to multiply an eight bit number by another eight bit number. This multiplier is constructed from add-one circuits and multiply circuits described previously. The unit in FIG. 30d forms and adds together the partial products $Q_1$ and $Q_5$ to form the sum $U_a$. The unit in FIG. 30c forms and adds together the partial products $Q_3$ and $Q_7$ to form the sum $U_c$. The unit in FIG. 30b forms and adds together the partial products $Q_2$ and $Q_6$ to form the sum $U_b$. The unit in FIG. 30a forms and adds together the partial products $Q_4$ and $Q_8$ to form the sum $U_d$. The unit in FIG. 30f is an adder which forms the sum $V_a$ by adding the sum $U_a$ obtained in the unit of FIG. 30e with the sum $U_c$ obtained from the unit in FIG. 30c. The unit in FIG. 30e is an adder which obtains the sum $V_b$ from the addition of the sum $U_b$ obtained by the unit in FIG. 30b and the sum $U_d$ obtained by the unit FIG. 30a. The unit in FIG. 30g is an adder which forms the final summation to obtain the product P. In this unit the sum $V_a$ obtained from the unit in FIG. 30f is added to the sum $V_b$ obtained from the unit in FIG. 30e.

The eight bit number A is entered by means of lines 801 through 808. Each of these lines is used as a diagrammatic showing of a pair of lines. Current in one line of each pair represents a zero while current in the other line of the pair represents a one. Each pair is merely represented as a single line or terminal in order to simplify the drawing. The eight bit number B is similarly entered by means of the terminals 811 through 818.

As previously stated, the unit in FIG. 30d forms and adds together the partial products $Q_1$ and $Q_5$. The first level of this unit includes the $T_0$ multiplier circuit 773, 775, 777, 779, three $T_1$ multiplier circuits 781, 783 and 785, and one $T_5$ multiplier circuit 787. The digits $a_1$, $a_2$, $a_3$ and $a_4$ form the $d$ input to the $T_0$ multiplier circuits 773, 775, 777 and 779. The digits $a_5$, $a_6$ and $a_7$ form the $e$ inputs respectively of the $T_1$ multiplier circuits 781, 783 and 785. The digits $a_1$, $a_2$ and $a_3$ form the $d$ inputs of the $T_1$ multiplier circuit 781, 783 and 785. The digit $a_8$ forms the $e$ input of the $T_5$ multiplier circuit 787. The digits $a_4$, $a_5$, $a_6$, $a_7$ and $a_8$ form the $d_1$, $d_2$, $d_3$, $d_4$ and $d_5$ inputs of the multiplier circuit 787. The digit $b_1$ forms the $f$ input to the $T_0$ multiplier circuits 773, 775, 777 and 779. This digit $b_1$ also forms the $f$ input to the $T_1$ multiplier circuits 781, 783, 785 and the $f$ input to the $T_5$ multiplier circuit 787. The digit $b_5$ forms the $g$ input to the $T_1$ multiplier circuits 781, 783, and 785 and the $g$ input to the $T_5$ multiplier circuit 787.

The second level of the unit in FIG. 30d includes the $R_2$ add-one circuit 789 and the $R_6$ add-one circuit 791. The $M_2$ output of the $T_1$ multiplier 781 forms the $b$ input to the $R_2$ add-one circuit 789. The $M_1$ and $M_2$ outputs form the $a_1$ and $a_2$ inputs respectively of the $R_2$ add-one circuit 789. The $M_2$ output of the $T_1$ multiplier circuit 785 forms the $b$ input of the $R_6$ add-one circuit 791. The $M_1$ through $M_6$ outputs of the $T_5$ multiplier block 787 form the $a_1$ through $a_6$ inputs to the $R_6$ add-one circuit 791.

The third level of the unit in FIG. 30d contains a single $R_7$ add-one circuit 793. The $c_2$ output of the $R_2$ add-one circuit 789 forms the $b$ input to the $R_7$ add-one circuit 793. The $M_1$ output of the $T_1$ multiplier circuit 785 in the first level forms the $a_1$ input in the $R_7$ add-one level 793. The $c_1$, $c_2$, $c_3$, $c_4$, $c_5$ and $c_6$ outputs of the $R_6$ add-one circuit 791 form the $a_2$, $a_3$, $a_4$, $a_5$, $a_6$ and $a_7$ inputs respectively of the $R_7$ add-one circuit 793. The $M_1$ outputs of the $T_0$ multiplier circuits 773, 775, 777 and 779 form the first, second third and fourth digits (four rightmost digits) respectively, of the sum $U_a$. The $M_1$ output of the $T_1$ multiplier circuit 781 forms the fifth digit of the sum $U_a$. The $c_1$ output of the $R_2$ add-one circuit 789 forms the sixth digit of the sum $U_a$. The $c_1$ through $c_7$ outputs of the $R_7$ add-one circuit 793 form the eighth through the thirteenth digits respectively of the sum $U_a$.

As previously mentioned, the unit in FIG. 30c forms and adds the partial products $Q_1$ and $Q_2$ to form the sum $U_c$. The unit includes four $T_0$ multiplier circuits 820 through 823, three $T_1$ multiplier circuits 824 through 826, and one $T_5$ multiplier circuit 827 in the first level. The second level includes one $R_2$ add-one circuit 829 and one $R_6$ circuit 830. The third level includes $R_7$ circuit 831. The digit $b_3$ forms the $f$ input to the three $T_1$ multiplier circuits 824 through 826 and the $f$ input to the $T_5$ multiplier circuit 827. The digit $b_7$ forms the $g$ input to the three $T_1$ multiplier circuits 824 through 826 and the $g$ input to the $T_5$ multiplier circuit 827. All other connections to and from circuit 820 through 831 are the same as described in connection with FIG. 30d.

As stated previously, the unit in FIG. 30b forms and adds the partial product $Q_2$ to the partial product $Q_6$ to form the sum $U_b$. The first level of this unit includes the four $T_0$ multiplier circuits 840 through 843, the three $T_1$ multiplier circuits 844 through 846 and one $T_5$ multiplier circuit 847. The second level of this unit includes an $R_2$ add-one circuit 849 and an $R_6$ add-one circuit 850. The third level includes a single $R_7$ add-one circuit 851. The digit $d_2$ forms the $f$ input to the four $T_0$ multiplier circuits 840 through 843. The digit $d_2$ also forms the $f$ input to the three $T_1$ multiplier circuits 840 through 846 and the $f$ input to the $T_5$ multiplier circuit 847. The remaining connections to the circuit 840 through 851 are the same as in the corresponding circuits in the FIG. 30d.

As previously mentioned, the unit in FIG. 30a forms and adds the partial products $Q_4$ and $Q_8$ to yield the sum $U_d$. The first level contains four $T_0$ multiplier circuits 860 through 863, three $T_1$ multiplier circuits 864 through 866 and one $T_5$ multiplier 867. The second level contains one $R_2$ add-one circuit 869 and one $R_6$ add-one circuit 870. The third level contains one $R_7$ add-one circuit 871. The digit $b_4$ forms the $f$ input to the four $T_0$ multiplier circuits 860 through 863. The digit $b_4$ also forms the $f$ input for the three $T_1$ multiplier circuits 864 through 866 and the $f$ input to the $T_5$ multiplier circuit 867. The digit $b_8$ forms the $g$ input to the three $T_1$ multiplier circuits 864 through 866 and the $g$ input to the $T_5$ multiplier circuit 867. All other connections to the circuits 860 through 871 are the same as the respective circuits in FIG. 30d.

The unit in FIG. 30f adds the sum $U_a$ to the sum $U_c$ to form the sum $V_a$. This unit is an adder which may be formed according to the algorithm 3 with $n=13$ and $k=2$. The first level of the adder contains ten $R_1$ add-one circuits 880 through 889 and one $R_3$ add-one circuit 890. The second level of the adder contains four $R_2$ add-one circuits 891 through 894 and one $R_3$ add-one circuit 895. The third level of this adder contains two $R_3$ add-one circuits 896 and 897 and one $R_4$ add-one circuit 898. The fourth level contains one $R_5$ add-one circuit 899. The fifth level of the adder contains one $R_9$ add-one circuit 900. The first and second digits of the sum $U_a$ bypass the adder by means of the lines 878 and 877, respectively. The third through thirteenth digits of the sum $U_a$ form the $b$ inputs to the add-one circuits 880 through 890 in the first level. The first through tenth (10 rightmost) digits of the sum $U_c$ form the $a_1$ inputs, respectively, to the $R_1$ add-one circuits 880 through 889 in the first level. The eleventh through thirteenth digits of the sum $U_c$ form the $a_1$, $a_2$, $a_3$ inputs, respectively, to the $R_3$ add-one circuit 890. The $c_2$ outputs of the $R_1$ add-one circuits 880, 882, 884 and 886 form the $b$ input respectively of the $R_2$ add-one circuits 891 through 894. The $c_2$ output of the $R_1$ add-one circuit 889 forms the $b$ input to the $R_3$ add-one circuit 895. The $c_1$ and $c_2$ outputs of the four $R_1$ add-one circuits 881, 883, 885 and 887 form the $a_1$ and $a_2$ inputs, respectively, to the $R_2$ add-one circuits 891 through 894. The outputs $c_1$, $c_2$ and $c_3$ of the $R_3$ add-one circuit form the $a_1$, $a_2$ and $a_3$ inputs, respectively, to the $R_3$ add-one circuit 895. The $c_2$ outputs of the $R_2$ add-one circuits 891 and 893 form the $b$ inputs to the $R_3$ add-one circuits 896 and 897. The $c_1$ output of the $R_1$ add-one circuit 882 and 886 in the first level form the $a_1$ inputs respectively to $R_3$ add-one circuits 896 and 897 in the third level. The $c_1$ and $c_2$ outputs of the $R_2$ add-one circuits 892 and 894 in the second level form the $a_2$ and $a_3$ inputs respectively to the $R_3$ add-one circuits 896 and 897 in the third level. The $c_2$ output from the $R_1$ add-one circuit 888 in the first level forms the $b$ level in the $R_4$ add-one circuit 898 in the third level. The $c_1$ output of the $R_1$ add-one circuit 899 forms the $a_1$ input to the $R_4$ add-one circuit 898 in the third level. The $c_1$, $c_2$ and $c_3$ outputs of the $R_3$ add-one circuit 895 in the second level form the $a_2$, $a_3$ and $a_4$ inputs, respectively, to the $R_4$ add-one circuit 898 in the third level. The $c_3$ output of the $R_3$ add-one circuit 897 forms the $b$ input to the $R_5$ add-one circuit 899. The $c_1$ output of the $R_1$ circuit 888 forms the $a_1$ input to the $R_5$ add-one circuit 899. The $c_1$, $c_2$, $c_3$ and $c_4$ outputs of the $R_4$ add-one circuit 894 form the $a_2$, $a_3$, $a_4$, $a_5$ inputs, respectively, to the $R_5$ add-one circuit 899. The $c_3$ output of the $R_3$ add-one circuit 896 forms the $b$ input to the $R_9$ add-one circuit 900. The $c_1$ output of the $R_1$ add-one circuit 884 in the first level forms the $a_1$ input to the $R_9$ add-one circuit 900. The $c_1$ output of the $R_2$ add-one circuit 893 forms the $a_2$ input to the $R_9$ add-one circuit 900. The $c_1$ and $c_2$ outputs of the $R_3$ add-one circuit 897 form the $a_3$ and $a_4$ inputs, respectively, to the $R_9$ add-one circuit 900. The $c_1$, $c_2$, $c_3$, $c_4$ and $c_5$ inputs of the $R_5$ add-one circuit 899 form the $a_5$, $a_6$, $a_7$, $a_8$ and $a_9$ inputs, respectively, to the $R_9$ add-one circuit 900.

The first two, or rightmost, digits of the sum $V_a$ appear on the line 878 and 877 and bypass the adder of the $R_1$ add-one circuit 880 which forms the third digit of the sum $V_a$. The $c_1$ output of the $R_2$ add-one circuit 891 forms the fourth digit of the sum $V_a$. The $c_1$ and $c_2$ outputs of the $R_3$ add-one circuit 896 in the third level form the fifth and sixth digits, respectively, of the sum $V_a$. The outputs $c_1$ through $c_9$ from the $R_9$ add-one circuit 900 form the seventh through fifteenth digits, respectively, of the sum $V_a$.

The unit in FIG. 30e adds the sum $U_d$ to the sum $U_b$ to obtain the sum $V_b$. This unit is an adder constructed according to algorithm 3 where $n=11$ and $k=2$. The first level of the adder constains ten $R_1$ add-one circuits 910 through 919 and one $R_3$ add-one circuit 920. The second level contains four $R_2$ add-one circuits 921 through 924 and one $R_3$ add-one circuit 925. The third level contains two $R_3$ add-one circuits 926 and 927 and one $R_4$ add-one circuit 928. The fourth level contains one $R_5$ add-one circuit 929. The fifth level contains one $R_9$ add-one circuit 930. The first two (two rightmost) digits of the sum $U_b$ bypass the adder by means of lines 906 and 907. The third through thirteenth digits of the sum $U_b$ form the $b$ inputs to the add-one circuit 910 through 920. The first through tenth digits of the sum $U_d$ form the $a_1$ inputs respectively of the $R_1$ add-one circuits 910 through 919. The eleventh through thirteenth digits of the sum $U_d$ form the $a_1$, $a_2$ and $a_3$ inputs, respectively, of the $R_3$ add-one circuit 920. The remaining connections between the add-one circuits 910 through 930 are essentially the same as the add-one circuits, respectively, in FIG. 30f.

The unit in FIG. 30g adds the sum $V_a$ to a sum $V_b$ to obtain the product P. This unit is an adder constructed according to algorithm 3 with $n=14$ and $k=1$. The first level of this adder contains thirteen $R_1$ add-one circuits 940 through 952 and one $R_2$ add-one circuit 953. The second level of this adder contains six $R_2$ add-one circuits 954 through 959 and one $R_2$ add-one circuit 960. The third level contains two $R_3$ add-one circuits 961 and 962 and one $R_3$ add-one circuit 963. The fourth level of this adder contains two $R_5$ add-one circuits 964 and 965. The fifth level of this adder contains one $R_7$ add-one circuit 966.

The first digit (rightmost digit) of the sum $V_a$ bypasses the adder by means of line 939. The second through fourteenth digits of the sum $V_a$ form the $b$ inputs respectively of the $R_1$ add-one circuits 940 through 952. The fifteenth digit of the sum $V_a$ forms the $b$ input to the $R_2$ add-one circuit 953. The first through thirteenth digits of the sum $V_b$ form the $a_1$ inputs respectively to the $R_1$ add-one circuits 940 through 952. The fourteenth and fifteenth digits of the sum $V_a$ form the $a_1$ and $a_2$ inputs respectively of the $R_2$ add-one circuit 953. The $c_2$ output of the $R_1$ add-one circuits of 940, 942, 944, 946, 948 and 950 in the first level form the $b$ inputs to the $R_2$ add-one circuits 954 through 959 in the second level. The $c_1$ and $c_2$ outputs of the $R_1$ add-one ciruits 941, 943, 945, 947, 949 and 951 in the first level form the $a_1$ and $a_2$ inputs, respectively, to the $R_2$ add-one circuits 954 through 959 in the second level. The $c_2$ output of the $R_1$ add-one circuit 952 forms the $b$ input to the $R_2$ add-one circuit 960. The $c_1$ and $c_2$ outputs of the $R_2$ add-one circuit 953 form the $a_1$ and $a_2$ inputs, respectively, of the $R_2$ add-one circuit 960. The $c_2$ outputs of the $R_2$ add-one circuits 954 and 956 form the $b$ inputs, respectively, the $R_3$ add-one circuits 961 and 962 in the third level. The $c_1$ outputs of the $R_1$ circuits 942 and 946 in the first level form the $a_1$ inputs to the $R_3$ add-one circuits 961 and 962 in the third level. The $c_1$ and $c_2$ outputs of the add-one circuits 955 and 957 form the $a_2$ and $a_3$ inputs, respectively, to the $R_3$ add-one circuits 961 and 962. The $c_2$ output of the $R_2$ add-one circuit 959 forms the $b$ input to the $R_3$ add-one circuit 963 in the third level. The $c_1$ output of the $R_1$ add-one circuit 952 forms the $a_1$ input to the $R_3$ add-one circuit 963 in the third level. The $c_1$ and $c_2$ outputs of the $R_2$ add-one circuit 960 level. The $c_1$ and $c_2$ outputs of the $R_2$ add-one circuits in the second level form the $a_2$ and the $a_3$ inputs, respectively, to the $R_3$ add-one circuit 963 in the third level.

The $c_3$ output of the $R_3$ add-one circuit 961 in the third level forms the $b$ input to the $R_5$ add-one circuit 964 in the fourth level. The $c_1$ output of the $R_1$ add-one circuit 944 in the first level forms the $a_1$ input to the $R_5$ add-one circuit 965 in the fourth level. The $c_1$ output of the $R_2$ add-one circuit 956 forms the $a_2$ input to the $R_5$ add-one circuit in the fourth level. The $c_1$, $c_2$ and $c_3$ outputs of the $R_3$ add-one circuit 962 form the $a_3$, $a_4$ and $a_5$ inputs, respectively, to the $R_5$ add-one circuit 964. The $c_2$ output of the $R_2$ add-one circuit 958 forms the $b$ input to the $R_5$ add-one circuit 965. The $c_1$ output of the $R_1$ add-one circuit 960 forms the $a_1$ input to the $R_5$ add-one circuit 965. The $c_1$ output of the $R_2$ add-one circuit 959 forms the $a_2$ input of the $R_5$ add-one circuit 965. The $c_1$, $c_2$ and $c_3$ outputs of the $R_3$ add-one circuit 963 form the $a_3$, $a_4$ and $a_5$ inputs, respectively, to the $R_5$ add-one circuit 965. The $c_5$ output of the $R_5$ add-one circuit 964 forms the $b$ input to the $R_7$ add-one circuit 966. The $c_1$ output from the $R_1$ add-one circuit 948 forms the $a_1$ input to the add-one circuit 966. The $c_1$ output of the $R_2$ circuit 958 forms the $a_2$ input of the $R_7$ add-one circuit 966. The $c_1$, $c_2$, $c_3$, $c_4$ and $c_5$ outputs of the $R_5$ add-one circuit 965 form the $a_3$, $a_4$, $a_5$, $a_6$ and $a_7$ inputs, respectively, of the $R_7$ add-one circuit 966.

The first digit $p_1$ of the product P is obtained from the line 939. The digit $c_1$ from the $R_1$ add-one circuit 940 in the first level forms the second digit $p_2$. The $c_1$ output of the $R_2$ add-one circuit 954 in the second level forms the third digit $p_3$ of the product. The $c_1$ and $c_2$ outputs of the $R_3$ add-one circuit 961 form the fourth and fifth digits $p_4$ and $p_5$ of the product. The $c_1$, $c_2$, $c_3$ and $c_4$ outputs of the $R_5$ add-one circuit 964 in the fourth level form the sixth through the ninth product digits $p_6$ through $p_9$. The $c_1$ through $c_7$ outputs of the $R_7$ add-one circuit 966 form the tenth through sixteenth digits, $p_{10}$ through $p_{16}$, of the product P. Thus, the result of the multiplication of the two eight bit numbers A and B is obtained as the product P.

It will be appreciated from the foregoing description that this invention has provided a novel add-one circuit in which a single digit number may be added to a second number having any number of digits. The construction shown has been in rectangular array form utilizing inhibitor logic. Variations of the basic add-one circuit permit the construction of other logic arithmetic circuits such as the adder and multiplier described. While the invention has been illustrated in several specific embodiments, it is to be understood that changes may be made without departing from the invention as set forth in the claims.

What is claimed is:

1. An adder for adding a first binary number $A=a_n$, $a_{n-1},\ldots, a_2, a_1$ and a second binary number $B=b_n$, $b_{n-1},\ldots, b_2, b_1$ including a plurality of add-one circuits interconnected to form a minimum number of levels L defined by the equation $L=-(-\log_2 n)+1$ where $n$ equals the total number of bits of the largest of the two numbers A and B, a plurality of output lines connected to selected add-one circuits in the various levels, whereby the adder response to the signals representative of the numbers A and B and generates signals on the output lines representative of the sum of A and B.

2. The apparatus of claim 1 wherein the add-one circuits are constructed from cryogenic devices.

3. The apparatus of claim 2 wherein the cryogenic devices are cryotrons.

4. An adder for adding a first number $A=a_n, a_{n-1},\ldots, a_2, a_1$ and a second number $B=b_n, b_{n-1},\ldots, b_2, b_1$ comprising two $R_1$ add-one circuits and one $R_2$ add-one circuit, each $R_1$ add-one circuit having two inputs and two outputs, the $R_2$ add-one circuit having three inputs and two outputs, one output of one of the $R_1$ add-one circuits and both outputs of the other $R_1$ add-one circuit being connected as inputs to the $R_2$ add-one circuit, the $R_1$ add-one circuits responding to signals representative of the first and second numbers to generate signals representing a sum of the first and second numbers, the lowest order of the sum being the signal on the other output of said one $R_1$ add-one circuit and the next two higher orders of the sum being signals from both outputs of the $R_2$ add-one circuit.

5. An adder for adding a first number $A=a_{n+k}$, $a_{n+k-1},\ldots, a_k, a_{k-1},\ldots, a_2, a_1$, the $k$ least significant bits of which are zero and a second number $B=b_n, b_{n-1},\ldots, b_2, b_1$, said adder including a plurality of add-one circuits interconnected to form a minimum number of levels L defined by the equation $L=-(-\log_2 n)+1$ where $n$ equals the total number of bits of the largest of the two numbers A and B, a plurality of output lines connected to selected add-one circuits in the various levels, whereby the adder responds to signals representative of the numbers A and B and generates signals on the output lines representative of the sum of A and B.

6. The apparatus of claim 5 wherein the add-one circuits are constructed on cryogenic devices.

7. The apparatus of claim 6 wherein the cryogenic devices are cryotrons.

8. An adder for adding a binary number $A=A_n$, $A_{n-1},\ldots A_2, A_1$ and a binary number $B=b_n, b_{n-1}\ldots b_2, b_1$ including a plurality of add-one circuits, each add-one circuit including an array having input lines to which signals are applied representative of a first binary number and a second binary number, the array including output lines on which signals are supplied representative of the sum of the first and second numbers, inhibitors disposed at selected crossover points of the input lines and the output lines whereby signals on the input lines operate the inhibitors and control the signals on the output lines to represent the sum of the first and second numbers, said plurality of add-one circuits being interconnected to form a minimum number of levels L defined by the equation $L=-(-\log_2 n)+1$ where $n$ equals the total number of places of the largest of the two numbers A and B, a plurality of output lines connected to selected add-one circuits in the various levels, whereby the adder responds to the signal representative of the numbers A and B and generates signals on the output lines representative of the sum of A and B.

References Cited by the Examiner

UNITED STATES PATENTS

| | | | |
|---|---|---|---|
| 2,856,126 | 10/1958 | Kilburn | 235—164 |
| 2,941,720 | 6/1960 | Marshall et al. | 235—164 |
| 2,962,216 | 11/1960 | Housman | 235—175 |
| 2,988,278 | 6/1961 | Richards | 235—175 |
| 3,004,705 | 10/1961 | Bremer | 235—164 |

OTHER REFERENCES

Pages 113 and 114, 1955: Richards, Arithmetic Operations, call letters TK 7888.3 R5 C.8.

ROBERT C. BAILEY, *Primary Examiner.*

CORNELIUS D. ANGEL, WALTER W. BURNS, JR., MALCOLM A. MORRISON, *Examiners.*